(12) United States Patent
Kuroda et al.

(10) Patent No.: US 7,539,104 B2
(45) Date of Patent: May 26, 2009

(54) INFORMATION RECORDING MEDIUM WITH SUPERPOSED FIRST AND SECOND RECORDING LAYERS

(75) Inventors: Kazuo Kuroda, Tokorozawa (JP); Takeshi Koda, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 371 days.

(21) Appl. No.: 10/594,502

(22) PCT Filed: Mar. 29, 2005

(86) PCT No.: PCT/JP2005/005872

§ 371 (c)(1),
(2), (4) Date: Sep. 28, 2006

(87) PCT Pub. No.: WO2005/093728

PCT Pub. Date: Oct. 6, 2005

(65) Prior Publication Data

US 2008/0232232 A1    Sep. 25, 2008

(30) Foreign Application Priority Data

Mar. 29, 2004  (JP) ............................. 2004-096526

(51) Int. Cl.
*G11B 15/04* (2006.01)
(52) U.S. Cl. ........................................ 369/53.2; 369/94
(58) Field of Classification Search ........................ None
See application file for complete search history.

(56) References Cited

U.S. PATENT DOCUMENTS

2003/0103429 A1*  6/2003  Senshu ................... 369/47.24
2004/0233812 A1* 11/2004  Kobayashi ............... 369/53.35

FOREIGN PATENT DOCUMENTS

| JP | 2000-331412 | 11/2000 |
| JP | 2001-176079 | 6/2001 |
| JP | 2001-266362 | 9/2001 |
| JP | 2002-170339 | 6/2002 |
| JP | 2002-216361 | 8/2002 |
| JP | 2003-151133 | 5/2003 |
| JP | 2003-157620 | 5/2003 |

* cited by examiner

*Primary Examiner*—Paul Huber
(74) *Attorney, Agent, or Firm*—Young & Thompson

(57) ABSTRACT

At least a first recording layer (L0 layer) and a second recording layer (l,1 layer) are provided. In the first recording layer, a first recording track path (a groove: a guiding groove) is formed for recording recording information. The second recording layer is arranged on the first recording layer and has a second recording track path (a groove: a guiding groove) formed in an opposite direction to the first recording track path for recording recording information. On an edge part on one side of the second recording layer, a first buffer area (103-1) is previously formed as a pre-recording area by an embossed pit (in the case of DVD-RW) or by a pit formed by recording laser irradiation (in the case of DVD-R).

16 Claims, 18 Drawing Sheets

FIG. 3

(for L0 layer+L1 layer)

| Field ID | Contents | Location |
|---|---|---|
| ID 0 | ECC block address | All recording areas |
| ID 1 | Start address of lead-out area／extended information, etc. | Lead-in area |
| ID 2 | Strategy information for 1x for L1 layer | Lead-in area |
| ID 3 | Manufacturer's identification number | Lead-in area |
| ID 4 | Manufacturer's identification number | Lead-in area |
| ID 5 | Strategy information for 1x for L1 layer | Lead-in area |
| ID 6 | Other | Lead-in area |
| ID 7 | Strategy information for 1x for L0 layer | Lead-in area |
| ID 8 | Manufacturer's identification number | Lead-in area |
| ID 9 | Manufacturer's identification number | Lead-in area |
| ID 10 | Strategy information for 1x for L0 layer | Lead-in area |
| ID 11 | Strategy information for 2x for L0 layer | Lead-in area |
| ID 12 | Strategy information for 2x for L0 layer | Lead-in area |
| ID 13 | Strategy information for 4x for L0 layer | Lead-in area |
| ID 14 | Strategy information for 4x for L0 layer | Lead-in area |
| ID 15 | Strategy information for 4x for L0 layer | Lead-in area |
| ID 16 | Strategy information for 4x for L0 layer | Lead-in area |
| ID 17 | Strategy information for 4x for L0 layer | Lead-in area |
| ID 18 | Strategy information for 4x for L0 layer | Lead-in area |

FIG. 4

(L0 layer+L1 layer)

| Field ID | Location | ECC block address |
|---|---|---|
| ID1 | Lead-in area start position | FF DD05h |
| ID2 | | |
| ID3 | | |
| ID4 | | |
| ID5 | | ⋮ |
| ID6 | | ⋮ |
| ID7 | | ⋮ |
| ID8 | | ⋮ |
| ⋮ | ⋮ | ⋮ |
| ⋮ | ⋮ | |
| ID17 | ⋮ | |
| ID18 | | |
| ID1 | | |
| ID2 | | |
| ⋮ | | |
| ID17 | | |
| ID18 | | |
| ID0 | | FF D003h |
| ID0 | | FF D002h |
| ID0 | | FF D001h |
| ID0 | Lead-in area end position | FF D000h |
| ID0 | | FF CFFFh |

FIG. 5

(Field ID #1)

| SYNC' | Data type | Bit Position Data | |
|---|---|---|---|
| 0 | 1to4 | 5 to 12 | |
| 0 | 0000 | ECC block address | |
| 0 | 0001 | ECC block address | |
| 0 | 0010 | ECC block address | |
| 0 | 0011 | Parity | |
| 0 | 0100 | Parity | |
| 0 | 0101 | Parity | |
| 0 | 0110 | Other | |
| 0 | 0111 | Other | |
| 0 | 1000 | Other | |
| 0 | 1001 | Start address of lead-out area | |
| 0 | 1010 | Start address of lead-out area | |
| 0 | 1011 | Start address of lead-out area | |
| 0 | 1100 | Other | Extended information |
| 0 | 1101 | Parity | |
| 0 | 1110 | Parity | |
| 0 | 1111 | Parity | |

Extended information

| Code | Maximum field identification number | |
|---|---|---|
| 0001 | Maximum number of Field ID is 5 | → for L1 layer |
| 0010 | Maximum number of Field ID is 13 | → for L0 layer |
| 0011 | Maximum number of Field ID is 18 | → for L0 layer + for L1 layer |

FIG.8
(a)
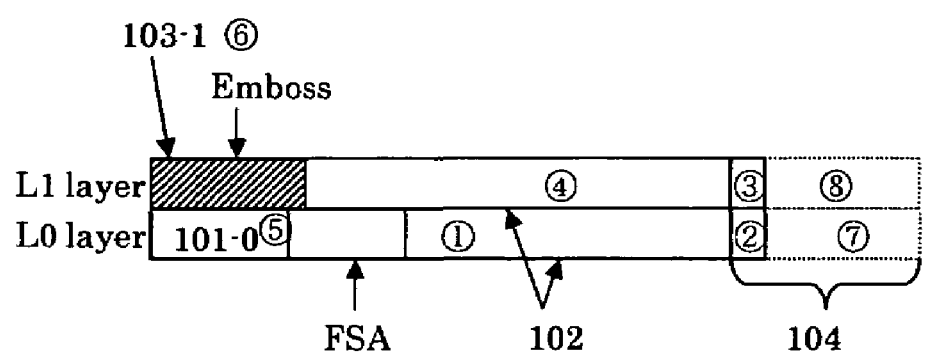
(b)
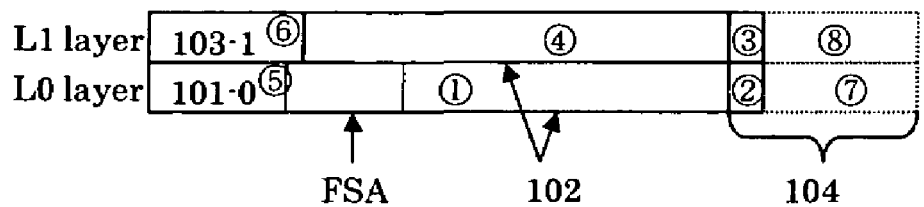

FIG. 10
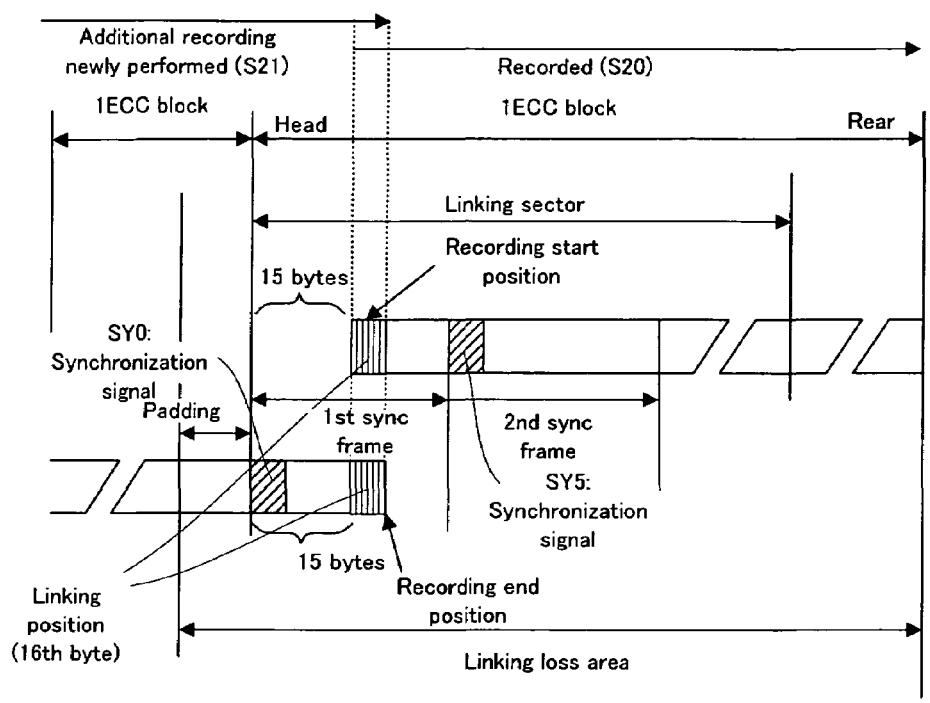
(a)
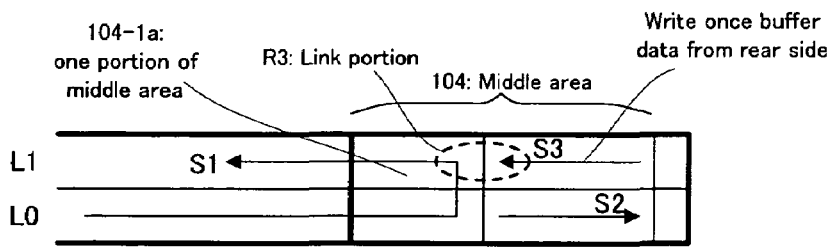
(b)

INFORMATION RECORDING MEDIUM WITH SUPERPOSED FIRST AND SECOND RECORDING LAYERS

This application is a 371 of PCT/JP05/05872, filed Mar. 29, 2005.

TECHNICAL FIELD

The present invention relates to an information recording medium, such as a DVD, an information recording apparatus, such as a DVD recorder, an information recording method, and a computer program.

BACKGROUND ART

In an information recording medium, such as a CD (Compact Disc) and a DVD, for example, as described in patent documents 1 and 2, etc., embossed pits, or pits obtained by irradiation of recording laser are formed in advance in a minimum necessary area of a lead-in area, in order to protect illegal copying and to protect falsification of management or control information.

Alternatively, in the recording operation for a single or multiple layer type optical disc, a sync and address information are recorded simultaneously with the recording of the data so as to maintain compatibility with a ROM (Read Only Memory) disc, and in order to reduce a time length for recording a lead-out at the time of a finalize process, there is also a technology of controlling a recording apparatus so as to perform a higher-speed recording operation if recording information into a lead-out area, than recording it into a data area, as described in a patent document 3.

Moreover, as described in a patent document 4, there is also a technology of controlling the recoding apparatus so as to perform a high-speed recording operation by changing the recording strategy of the recording laser if recording the information into the lead-out area.

Moreover, as described in a patent document 5, there is also such a recoding apparatus that minimizes the length of the lead-out area, while maintaining the compatibility with the ROM disc.

Patent document 1: Japanese Patent Application Laid Open NO. 2001-266362
Patent document 2: Japanese Patent Application Laid Open NO. 2000-331412
Patent document 3: Japanese Patent Application Laid Open NO. 2001-176079
Patent document 4: Japanese Patent Application Laid Open NO. 2003-151133
Patent document 5: Japanese Patent Application Laid Open NO. 2003-157620
Patent document 6: Japanese Patent Application Laid Open NO. 2002-170339

DISCLOSURE OF INVENTION

Subject to be Solved by the Invention

However, in the case of a single layer optical disc, it is only a lead-in area that a start position or the like is determined. The start position of a lead-out area cannot be determined, so that the embossed pits or the pits obtained by the irradiation of the recording laser cannot be formed in advance.

Moreover, in the recording operation for the single or multiple layer type optical disc, the sync and the address information are recorded simultaneously with the recording of the data so as to maintain compatibility with a ROM (Read Only Memory) disc, and even if the length of the lead-out area is reduced, or the high-speed recording of the lead-out area is performed at the time of the finalize process, still, because the lead-out area is recorded, there is such a technical problem that it is unavoidable that it takes time to record the lead-out area.

In addition, there is also such a technical problem that the advanced control of a recording apparatus is essential, in order to set the length of the lead-out area to be variable-length, and to perform the high-speed recording of the lead-out area.

In order to solve the above-mentioned problem, it is therefore an object of the present invention to provide an information recording medium, an information recording apparatus and an information recording method, which can efficiently record information into each recording layer of the multilayer type information recording medium, and which can reduce a recording time length.

Means for Solving the Subject (Information Recording Medium)
Hereinafter, the information recording medium of the present invention will be discussed.

The above object of the present invention can be achieved by a first information recording medium provided with: a first recording layer (L0 layer) in which a first recoding track path (groove: guidance groove) for recording at least record information, is formed; a second recording layer (L1 layer) which is disposed on the first recording layer and in which a second recoding track path (groove: guidance groove) for recording the record information, is formed in an opposite direction to the first recording track path, a first buffer area (lead-out area) for preventing a recording or reproduction position from deviating from the second recording layer, being formed in advance as a pre-recorded area, of embossed pits (in the case of a DVD-RW) or pits obtained by irradiation of recording laser (in the case of a DVD-R), in one edge portion of the second recording layer.

According to the first information recording medium of the present invention, the first and second recording layers are laminated or stacked on one side of a disc-shaped substrate, for example, and it is a two-layer type or multilayer type DVD or optical disc, or the like, for example. In the first recording layer, it is possible to record the record information, such as audio, video information, or content information, for example, along the first recording track path constructed from the groove (guidance groove). In the second recording layer, it is possible to record the record information, such as audio, video information, or content information, for example, along the second recording track path constructed from the groove (guidance groove). By virtue of such construction, the recording or reproduction laser light is irradiated onto the substrate, the first recording layer, and the second recording layer, in this order.

In the first information recording medium, particularly, the first recording track path is directed from one side to the other, out of the inner and outer circumferential sides of the disc-shaped substrate, for example. In contrast, the second recording track path is directed from the other side to the one side. Namely, in the two-layer type or multilayer type information recording medium, continuous recording by an "opposite method" can be performed, in which the recording track paths are directed in the opposite directions between the two recording layers. Therefore, if the recording is continuously performed (i) from the end edge of the first recording layer, i.e. the other edge portion, such as the outer circumferential edge portion, (ii) to the start edge of the second recording layer, i.e. the other edge portion, such as the outer circumferential edge portion, then, the irradiation position of the laser light in the substrate surface is hardly or not changed at all in the radial direction, in changing the recording layer as a target of a recording process or reproduction process related to the information, which allows fast layer jump (i.e. a layer change operation). This is extremely useful in practice, in the point that a special buffer function is not necessary to change the recording layer when the continuous record information, such as a movie, for example, is recorded, and that uninterrupted reproduction is easily performed.

Particularly in the first information recording medium, in the one edge portion, such as the inner circumferential edge portion, of the second layer, the first buffer area, which is a lead-out area, is formed in advance of the embossed pits as the pre-recorded area, if the information recording medium is a DVD-RW, for example, wherein the first buffer area is for preventing the recording or reproduction position, or a position for search in the reproduction, with respect to the second recording layer from deviating to the outside of the substrate, namely, for preventing the above position from deviating from the second recording layer. Alternatively, the first buffer area is formed in advance of the pits obtained by the irradiation of the recording layer as the pre-recorded area, if information recording medium is a DVD-R.

Thus, according to the first information recording medium, in the finalize process in the case where, for example, the last information out of the record information is written or has written by the writing device, such as an optical pickup, of an information recording apparatus described later, it is only necessary to add buffer data up to the start position of the first buffer area, which is the lead-out area, formed in advance as the pre-recorded area in the one edge portion, such as the inner circumferential edge portion, of the second recording layer, from the end position of the written last information. Thus, it is possible to omit the adding of the buffer data into the entire first buffer area at the time of the finalize process, and it is possible to greatly reduce a time length required for the finalize process. Thus, it is possible to realize (i) the reduction of the recording operation time length and (ii) user's comfortable use.

In the optical disc, such as the two-layer type DVD-R or R/W, finalized in the above manner, the normal control of tracking servo can be performed by the optical pickup of a general DVD-ROM read-only drive, so that it is possible to realize the maintaining of the compatibility with a general DVD-ROM. Thus, in the optical disc, such as the two-layer type DVD-R or R/W, the reproduction can be performed by the general DVD-ROM read-only drive.

The above object of the present invention can be achieved by a second information recording medium provided with: a first recording layer (L0 layer) in which a first recoding track path (groove: guidance groove) for recording at least record information, is formed; a second recording layer (L1 layer) which is disposed on the first recording layer and in which a second recoding track path (groove: guidance groove) for recording the record information, is formed in a same direction to the first recording track path, a first buffer area (lead-out area) for preventing a recording or reproduction position from deviating from the first recording layer or the second recording layer, being formed in advance as a pre-recorded area, of embossed pits (in the case of a DVD-RW) or pits obtained by irradiation of recording laser (in the case of a DVD-R), in other edge portions of the first recording layer and the second recording layer.

According to the second information recording medium of the present invention, it has substantially the same construction as in the first embodiment, and the first and second recording layers are laminated or stacked on one side of a disc-shaped substrate, for example, and it is a two-layer type or multilayer type DVD or optical disc, or the like, for example.

In the second information recording medium, particularly, the first recording track path is directed from one side to the other, out of the inner and outer circumferential sides of the disc-shaped substrate, for example. As in the first recording track path, the second recording track path is also directed from the one side to the other. Namely, in the two-layer type or multilayer type information recording medium, continuous recording by a "parallel method" can be performed, in which the recording track paths are directed in the same directions between the two recording layers. In the parallel method, if the recording or reproduction in the first recording layer is ended, the optical pickup, located on the outermost circumference of the optical disc, for example, needs to be displaced again toward the innermost circumference, when the recording or reproduction in the second recording layer is started. Thus, as compared to the opposite method, it takes more time by that much to change the recording layer from the first recording layer to the second recording layer.

Particularly in the second information recording medium, in the other edge portions, such as the outer circumferential edge portions, of the first and second recording layers, the first buffer area, which is the lead-out area, is formed in advance of the embossed pits as the pre-recorded area, if the information recording medium is a DVD-RW, for example, wherein the first buffer area is for preventing the recording or reproduction position, or the position for search in the reproduction, with respect to the first and second recording layers from deviating to the outside of the substrate, namely, for preventing the above position from deviating from the first or second recording layer, and for layer jump in the continuous reproduction of the plurality of layers. Alternatively, the first buffer area is formed in advance of the pits obtained by the irradiation of the recording layer as the pre-recorded area if information recording medium is a DVD-R.

Thus, according to the second information recording medium, in the finalize process in the case where, for example, the last information out of the record information is written or has written by the writing device, such as the optical pickup, of the information recording apparatus described later, it is only necessary to add the buffer data up to the start position of the first buffer area, which is the lead-out area, formed in advance as the pre-recorded area in the other edge portions, such as the outer circumferential edge portions, of the first and second recording layers, from the end position of the written last information. Thus, as in the first information recording medium, it is possible to omit the adding of the buffer data into the entire first buffer area, which is the lead-out area, at the time of the finalize process, and it is possible to greatly reduce a time length required for the finalize process. Thus, it is possible to realize (i) the reduction of the recording operation time length and (ii) user's comfortable use.

Alternatively, it is also possible to add the buffer data, from one of the end edge positions of the record information in the first and second recording layers which has a larger address value, to an address value minimum necessary to form another lead-out area located on one side of the first buffer area, at the time of the finalize process. In this case, an area in an unrecorded condition, i.e. in a mirror condition, is generated between this another lead-out area and the first buffer area; however, this is no problem since anything can be recorded on the outer circumferential side of this another lead-out area. If this recording method is applied to the information recording medium, it is possible to further reduce a recording time length.

The above object of the present invention can be achieved by a third information recording medium provided with: a recording layer in which a recording track path (groove: guidance groove) for recording record information is formed, a first buffer area (lead-out area) for preventing a recording or reproduction position from deviating from the recording layer, being formed in advance as a pre-recorded area, of embossed pits (in the case of a DVD-RW) or pits obtained by irradiation of recording laser (in the case of a DVD-R), in other edge portion of the recording layer.

According to the third information recording medium of the present invention, the recording layer is laminated or stacked on one side of a disc-shaped substrate, for example, and it is a single layer type DVD or optical disc, or the like, for example.

In the third information recording medium, particularly, the recording track path is directed from one side to the other, out of the inner and outer circumferential sides of the disc-shaped substrate, for example.

Particularly in the third information recording medium, in the other edge portion, such as the outer circumferential edge portion, of the recording layer, the first buffer area, which is the lead-out area, is formed in advance of the embossed pits as the pre-recorded area, if the information recording medium is a DVD-RW, for example, wherein the first buffer area is for preventing the recording or reproduction position, or the position for search in the reproduction, with respect to the recording layer from deviating to the outside of the substrate, namely, for preventing the above position from deviating from the recording layer. Alternatively, the first buffer area is formed in advance of the pits obtained by the irradiation of the recording layer as the pre-recorded area, if information recording medium is a DVD-R.

Thus, according to the third information recording medium, in the finalize process in the case where, for example, the last information out of the record information is written or has written by the writing device, such as the optical pickup, of the information recording apparatus described later, it is only necessary to add the buffer data up to the start position of the first buffer area, which is the lead-out area, formed in advance as the pre-recorded area in the other edge portion, such as the outer circumferential edge portion, of the recording layer, from the end position of the written last information. Thus, as in the first and second information recording media, it is possible to omit the adding of the buffer data into the entire first buffer area, which is the lead-out area, at the time of the finalize process, and it is possible to greatly reduce a time length required for the finalize process. Thus, it is possible to realize (i) the reduction of the recording operation time length and (ii) user's comfortable use.

Alternatively, it is also possible to add the buffer data, from the address value of the end edge position of the record information in the recording layer, to an address value minimum necessary to form another lead-out area located on one side of the first buffer area, at the time of the finalize process. In this case, an area in the unrecorded condition, i.e. in the mirror condition, is generated between this another lead-out area and the first buffer area; however, this is no problem since anything can be recorded on the outer circumferential side of this another lead-out area. If this recording method is applied to the information recording medium, it is possible to further reduce a recording time length.

In one aspect of the first, second, and third information recording media of the present invention, the information recording medium is further provided with a control data zone in a lead-in area accessed before the record information is recorded, as another pre-recorded area, and identification information (flag) indicating that the first buffer area is formed in advance, is recorded in the control data zone.

According to this aspect, in the recording or reproduction operation performed by the information recording apparatus described later, the identification information, such as flag, is read from the control data zone in the lead-in area of the information recording medium, in addition to various management or control information, before the actual reproduction or recording operation, by using the optical pickup or the like, for example. Then, preferably, the read various information may be stored in a register, a memory, or the like, for example.

Therefore, by using the information recording apparatus described later, it is possible to judge whether or not the first buffer area is formed in advance, quickly and certainly, on the basis of the read or stored identification information.

In another aspect of the first, second, and third information recording media of the present invention, pre-format address information (LPP: Land PrePit) is recorded in each of said recording layers, and identification information (flag) indicating that the first buffer area is formed in advance, is added to the pre-format address information.

According to this aspect, in the recording or reproduction operation performed by the information recording apparatus described later, the identification information, such as the flag, is read from the lead-in area of the information recording medium, with it added to the pre-format address information, such as the land pre-pits (LPP) and frequency-modulated or phase-modulated wobble, before the actual reproduction or recording operation, by using the optical pickup or the like, for example. Then, preferably, the read various information may be stored in a register, a memory, or the like, for example.

Therefore, by using the information recording apparatus described later, it is possible to judge whether or not the first buffer area is formed in advance, quickly and certainly, on the basis of the read or stored identification information.

In this aspect, start address information indicating a start position of the first buffer area formed in advance, may be recorded in the control data zone, or is added to pre-format address information.

By virtue of such construction, the writing device, such as the optical pickup, can add the buffer data, quickly and certainly, up to the start position of the first buffer area, on the basis of the start address information read (e.g. read from management area) or stored by the information recording apparatus described later.

Moreover, in this aspect, the start address information may indicate that the first buffer area is not formed in advance, when having a predetermined value ("00h").

By virtue of such construction, when the start address information read or stored by the information recording apparatus described later has the predetermined value ("00h"), for example, it is possible to identify that the first buffer area is not formed in advance, easily, simply, and with a minimum information amount.

In another aspect of the first, second, and third information recording media of the present invention, (i) the first buffer area is formed in advance of embossed pits, and (ii) a recording film capable of performing additional recording, is laminated thereon.

According to this aspect, it is possible to easily realize a so-called hybrid type optical disc on which the embossed pits are formed in one portion of the recording areas and the recording film capable of performing additional recording is laminated in another portion of the recording areas. Namely, the recording film capable of performing the same additional recording is laminated in all the areas of the optical disc, so that it is unnecessary to perform the removal or exfoliation of the partial recording layer, and it is simple in manufacturing.

(Information Recording Apparatus)

Hereinafter, the information recording apparatus of the present invention will be discussed.

The above object of the present invention can be also achieved by a first information recording apparatus (i-a) for recording a first portion of the record information along the first recording track path, and (ii-a) for recording a second portion of the record information, with a recording direction turned around, along the second recording track path, with respect to the above-mentioned first information recording medium of the present invention constructed such that (iii-1) the first recording layer has a first recording capacity and (iii-2) the second recording layer has a second recording capacity, the information recording apparatus provided with: a writing device capable of respectively writing the record information into the first recording layer and the second recording layer as the first portion and the second portion; a calculating device for calculating a turn-around address on the first recording track path, in turning around from the first recording track path to the second recording track path, in a case (iv-1) where the first portion with an information amount which is equal to or less than the first recording capacity, out of the record information, is written along the first recording track path, and (iv-2) where the second portion with an information amount which is equal to or less than the second recording capacity is written along the second recording track path, on the basis of (v-1) a total information amount of the record information, (v-2) the start address information indicating the start address of the first buffer area formed in advance, (v-3) the first recording capacity, and (v-4) the second recording capacity; and a controlling device for controlling the writing device, (i) to write the first portion into the first recording layer along the first recording track path up to the calculated turn-around address, and (ii) to write the second portion into the second recording layer along the second recording track path from a correspondence address in the second recording layer corresponding to the calculated turn-around address in the first recording layer.

According to the first information recording apparatus of the present invention, firstly, the calculating device, such as a CPU (Central Processing Unit) of a drive disc or a host computer, for example, calculates the turn-around address on the first recording track path, in turning around from the first recording track path to the second recording track path, in a case where the first portion with an information amount which is equal to or less than the first recording capacity, out of the record information, is written along the first recording track path, and where the second portion with an information amount which is equal to or less than the second recording capacity is written along the second recording track path, on the basis of the total information amount of the record information, the start address information indicating the start position of the first buffer area formed in advance, the first recording capacity, and the second recording capacity, which are known before the recording operation, for example.

Then, under the control of the controlling device, such as the CPU, for example, the writing device, such as the optical pickup, for example, for writing the record information into the first and second recording layers, writes the first portion of the record information into the first recording layer along the first recording track path, up to the calculated turn-around address. Then, the writing device writes the second portion of the record information into the second recording layer along the second recording track path, from the correspondence address in the second recording layer corresponding to the calculated turn-around address in the first recording layer. Here, the address, related to the turn-around address and the correspondence address, may be a physical sector number, or a logical block address. Moreover, as one specific example of the correspondence relationship between the turn-around address in the first recording layer and the correspondence address in the second recording layer, it is a complement number's relationship, in the case of the physical sector number. More specifically, it is a relationship between "0011" and "1100", in binary expression. Alternatively, as another specific example, it is an inverse proportion relationship, in the case of the logical block address. More specifically, it is a relationship that "Y"=constant–"X", wherein "X" is the turn-around address in the first recording layer and "Y" is the correspondence address in the second recording layer.

On the basis of the total information amount of the record information, the start address information indicating the start position of the first buffer area formed in advance, the first recording capacity, and the second recording capacity, it is possible to perform the recording operation for the optical disc, such as the two-layer type DVD-R or R/W, for example, while efficiently using the recording areas.

In particular, according to the first information recording apparatus of the present invention, in the finalize process in the case where, for example, the last information out of the record information is written or has written by the writing device, such as the optical pickup, it is only necessary to add the buffer data up to the start position of the first buffer area, which is the lead-out area, formed in advance as the pre-recorded area in the one edge portion, such as the inner circumferential edge portion, of the second recording layer, from the end position of the written last information. Thus, it is possible to omit the adding of the buffer data into the entire first buffer area at the time of the finalize process, and it is possible to greatly reduce a time length required for the finalize process. Thus, it is possible to realize (i) the reduction of the recording operation time length and (ii) user's comfortable use.

Incidentally, even the information recording apparatus of the present invention can adopt the same aspects as the various aspects of the above-mentioned information recording medium of the present invention, as occasion demands.

In one aspect of the first information recording apparatus of the present invention, the controlling device controls the writing device to add the buffer data up to the start position of the first buffer area, in response to a finalize instruction for maintaining compatibility with a read-only or reproduce-only information recording medium.

According to this aspect, in the finalize process in the case where, for example, the last information out of the record information is written or has written, it is only necessary to add the buffer data up to the start position of the first buffer area, which is the lead-out area, formed in advance as the pre-recorded area in the one edge portion, such as the inner circumferential edge portion, of the second recording layer, from the end position of the written last information, by using the writing device, such as the optical pickup, under the control of the controlling device. Thus, it is possible to omit the adding of the buffer data into the entire first buffer area, which is the lead-out area, at the time of the finalize process, and it is possible to greatly reduce a time length required for the finalize process. Thus, it is possible to realize (i) the reduction of the recording operation time length and (ii) user's comfortable use.

In another aspect of the first information recording apparatus of the present invention, the controlling device controls the writing device to add the buffer data. in order to form at least one portion of a second buffer area (middle area), (i) for preventing a recording or reproduction position from deviating from the first recording layer or the second recording layer and (ii) for layer jump, in other edge portions of the first recording layer and the second recording layer, after the writing up to the turn-around address in the first recording layer, and before the writing from the correspondence address in the second recording layer.

According to this aspect, at least one portion of the second buffer area, which is the middle area, is formed by the writing device adding the buffer data, in order to prevent the recording or reproduction position, or the position for search in the reproduction, with respect to the first and second recording layers from deviating to the outside of the substrate, namely, to prevent the above position from deviating from the first or second recording layer, and in order to perform layer jump in the continuous reproduction of the plurality of recording layers, under the control of the controlling device.

Thus, by linking effective information to be recorded into the first and second recording layers, through at least one portion of the second buffer area, it is possible to prevent the effective information from being directly linked, and it is possible to almost or completely prevent the deterioration of signal quality.

In addition, at the time of the finalize process, the buffer data is added so as to fill the remaining another portion of the second buffer area, which is the middle area in the first and second recording layers, to thereby form the second buffer area with a length in the radial direction of 0.5 mm or more, for example.

In the optical disc, such as the two-layer type DVD-R or R/W, finalized in the above manner, the normal control of tracking servo can be performed by the optical pickup of a general DVD-ROM read-only drive, so that it is possible to realize the maintaining of the compatibility with a general DVD-ROM, more certainly.

In another aspect of the first information recording apparatus of the present invention, the controlling device controls the writing device to write the buffer data, in order to form a third buffer area located on one side of the second buffer area, on the basis of (i) the total information amount of the record information, (ii) the start address information indicating the start address of the first buffer area formed in advance, (iii) the first recording capacity, and (iv) the second recording capacity.

According to this aspect, at the time of the finalize process, for example, by setting the outer circumferential side of the third buffer area, to be in the unrecorded condition, i.e. in the mirror condition, on the basis of the total amount of the record information and the like, under the control of the controlling device, it is possible to greatly reduce a time length required for the finalize process, and it is possible to realize (i) the reduction of the recording operation time length and (ii) user's comfortable use.

The above object of the present invention can be also achieved by a second information recording apparatus (i-a) for recording a first portion of the record information along the first recording track path, and (ii-a) for recording a second portion of the record information along the second recording track path which is the same recording direction as that of the first recording track path, with respect to the above-mentioned second information recording medium of the present invention constructed such that (iii-1) the first recording layer has a first recording capacity and (iii-2) the second recording layer has a second recording capacity, the information recording apparatus provided with: a writing device capable of respectively writing the record information into the first recording layer and the second recording layer as the first portion and the second portion; a calculating device for calculating a first recording end edge address on the first recording track path and a second recording end edge address on the second recording track path, in a case (iv-1) where the first portion with an information amount which is equal to or less than the first recording capacity, out of the record information, is written along the first recording track path, and (iv-2) where the second portion with an information amount which is equal to or less than the second recording capacity is written along the second recording track path, on the basis of (v-1) a total information amount of the record information, (v-2) the start address information indicating the start address of the first buffer area formed in advance, (v-3) the first recording capacity, and (v-4) the second recording capacity; and a controlling device for controlling the writing device, (i) to write the first portion into the first recording layer along the first recording track path up to the calculated first recording end edge address, and (ii) to write the second portion into the second recording layer along the second recording track path up to the calculated second recording end edge address.

According to the second information recording apparatus of the present invention, firstly, the calculating device, such as the CPU of a drive disc or a host computer, for example, calculates the first recording end edge address on the first recording track path and the second recording end edge address on the second recording track path, in a case where the first portion with an information amount which is equal to or less than the first recording capacity, out of the record information, is written along the first recording track path, and where the second portion with an information amount which is equal to or less than the second recording capacity is written along the second recording track path, on the basis of the total information amount of the record information, the start address information indicating the start address of the first buffer area formed in advance, the first recording capacity, and the second recording capacity, which are known before the recording operation, for example.

Then, under the control of the controlling device, such as the CPU, for example, the writing device, such as the optical pickup, for example, for writing the record information into the first and second recording layers, writes the first portion of the record information into the first recording layer along the first recording track path, up to the calculated first recording end edge address. Then, the writing device writes the second portion of the record information into the second recording layer along the second recording track path, up to the calculated second recording end edge address. Here, the address, related to the first and second recording end edge addresses and the correspondence address, may be a physical sector number, or a logical block address.

On the basis of the total information amount of the record information, the start address information indicating the start position of the first buffer area formed in advance, the first recording capacity, and the second recording capacity, it is possible to perform the recording operation for the optical disc, such as the two-layer type DVD-R or R/W, for example, while efficiently using the recording areas.

Thus, according to the second information recording apparatus of the present invention, in the finalize process in the case where, for example, the last information out of the record information is written or has written by the writing device, such as the optical pickup, it is only necessary to add the buffer data up to the start position of the first buffer area, which is the lead-out area, formed in advance as the pre-recorded area in the other edge portions, such as the outer circumferential edge portions, of the first and second recording layers, from the end position of the written last information. Thus, as in the first information recording apparatus, it is possible to omit the adding of the buffer data into the entire first buffer area, which is the lead-out area, at the time of the finalize process, and it is possible to greatly reduce a time length required for the finalize process. Thus, it is possible to realize (i) the reduction of the recording operation time length and (ii) user's comfortable use.

Incidentally, even the second information recording apparatus of the present invention can adopt the same aspects as the various aspects of the above-mentioned second information recording medium of the present invention.

In one aspect of the second information recording apparatus of the present invention, the controlling device controls the writing device to write the buffer data, from one of the first and second recording end edge addresses which has a larger address value, to an address value minimum necessary to form a fourth buffer area located on one side of the first buffer area, in response to a finalize instruction for maintaining compatibility with a read-only or reproduce-only information recording medium.

According to this aspect, it is also possible to add the buffer data, from one of the first and second recording end edge addresses which has a larger address value, to the address value minimum necessary to form the fourth buffer area, which is another lead-out area, located on one side of the first buffer area, for example, at the time of the finalize process, for example. In this case, an area in the unrecorded condition, i.e. in the mirror condition, is generated between the fourth buffer area and the first buffer area; however, this is no problem since anything can be recorded on the outer circumferential side of the fourth buffer area. If this recording method is applied to the information recording medium, it is possible to further reduce a recording time length.

(Information Recording Method)

Hereinafter, the information recording method of the present invention will be discussed.

The above object of the present invention can be also achieved by a first information recording method in an information recording apparatus comprising a writing device (i-a) for recording a first portion of the record information along the first recording track path, and (ii-a) for recording a second portion of the record information, with a recording direction turned around, along the second recording track path, with respect to the above-mentioned first information recording medium of the present invention constructed such that (iii-1) the first recording layer has a first recording capacity and (iii-2) the second recording layer has a second recording capacity, the information recording method provided with: a calculating process of calculating a turn-around address on the first recording track path, in turning around from the first recording track path to the second recording track path, in a case where (iv-1) the first portion with an information amount which is equal to or less than the first recording capacity, out of the record information, is written along the first recording track path, and (iv-2) where the second portion with an information amount which is equal to or less than the second recording capacity is written along the second recording track path, on the basis of (v-1) a total information amount of the record information, (v-2) the start address information indicating the start address of the first buffer area formed in advance, (v-3) the first recording capacity, and (v-4) the second recording capacity; and a controlling process of controlling the writing device, (i) to write the first portion into the first recording layer along the first recording track path up to the calculated turn-around address, and (ii) to write the second portion into the second recording layer along the second recording track path from a correspondence address in the second recording layer corresponding to the calculated turn-around address in the first recording layer.

According to the first information recording method of the present invention, as in the case of the above-mentioned first information recording apparatus of the present invention, on the basis of the total information amount of the record information, the start address information indicating the start position of the first buffer area formed in advance, the first recording capacity, and the second recording capacity, it is possible to perform the recording operation for the optical disc, such as the two-layer type DVD-R or R/W, for example, while efficiently using the recording areas, under the control of the controlling process.

In particular, in the finalize process, it is only necessary to add the buffer data up to the start position of the first buffer area, which is the lead-out area, formed in advance as the pre-recorded area in the one edge portion, such as the inner circumferential edge portion, of the second recording layer, from the end position of the written last information, by using the writing device, such as the optical pickup, under the control of the controlling device. Thus, at the time of the finalize process, it is possible to omit the adding of the buffer data into the entire first buffer area at the time of the finalize process, and it is possible to greatly reduce a time length required for the finalize process. Thus, it is possible to realize (i) the reduction of the recording operation time length and (ii) user's comfortable use.

Incidentally, even the first information recording method of the present invention can adopt the same aspects as the various aspects of the above-mentioned first information recording apparatus of the present invention.

The above object of the present invention can be also achieved by a first information recording method in an information recording apparatus comprising a writing device (i-a) for recording a first portion of the record information along the first recording track path, and (ii-a) for recording a second portion of the record information along the second recording track path which is the same recording direction as that of the first recording track path, with respect to the above-mentioned second information recording medium of the present invention constructed such that (iii-1) the first recording layer has a first recording capacity and (iii-2) the second recording layer has a second recording capacity, the information recording method provided with: a calculating process of calculating a first recording end edge address on the first recording track path and a second recording end edge address on the second recording track path, in a case (iv-1) where the first portion with an information amount which is equal to or less than the first recording capacity, out of the record information, is written along the first recording track path, and (iv-2) where the second portion with an information amount which is equal to or less than the second recording capacity is written along the second recording track path, on the basis of (v-1) a total information amount of the record information, (v-2) the start address information indicating the start address of the first buffer area formed in advance, (v-3) the first recording capacity, and (v-4) the second recording capacity; and a controlling process of controlling the writing device, (i) to write the first portion into the first recording layer along the first recording track path up to the calculated first recording end edge address, and (ii) to write the second portion into the second recording layer along the second recording track path up to the calculated second recording end edge address.

According to the second information recording method of the present invention, as in the case of the above-mentioned second information recording apparatus of the present invention, on the basis of the total information amount of the record information, the start address information indicating the start position of the first buffer area formed in advance, the first recording capacity, and the second recording capacity, it is possible to perform the recording operation for the optical disc, such as the two-layer type DVD-R or R/W, for example, while efficiently using the recording areas, under the control of the controlling process.

In particular, in the finalize process, it is only necessary to add the buffer data up to the start position of the first buffer area, which is the lead-out area, formed in advance as the pre-recorded area in the other edge portions, such as the outer circumferential edge portions, of the second recording layer, from the end position of the written last information, by using the writing device, such as the optical pickup, under the control of the controlling device. Thus, as in the first information recording method, at the time of the finalize process, it is possible to omit the adding of the buffer data into the entire first buffer area at the time of the finalize process, and it is possible to greatly reduce a time length required for the finalize process. Thus, it is possible to realize (i) the reduction of the recording operation time length and (ii) user's comfortable use.

Incidentally, even the second information recording method of the present invention can adopt the same aspects as the various aspects of the above-mentioned second information recording apparatus of the present invention.

(Computer Program)

Hereinafter, the computer program of the present invention will be discussed.

The above object of the present invention can be also achieved by a first computer program of instructions for recording control and for tangibly embodying a program of instructions executable by a computer provided in the above-mentioned first information recording apparatus of the present invention (including its various aspects), the computer program making the computer function as at least one portion of the controlling device, the calculating device, and the writing device.

According to the first computer program of the present invention, the above-mentioned first information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned first information recording apparatus of the present invention, the first computer program of the present invention can also adopt various aspects.

The above object of the present invention can be also achieved by a second computer program of instructions for recording control and for tangibly embodying a program of instructions executable by a computer provided in the above-mentioned second information recording apparatus of the present invention (including its various aspects), the computer program making the computer function as at least one portion of the controlling device, the calculating device, and the writing device.

According to the second computer program of the present invention, the above-mentioned second information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned second information recording apparatus of the present invention, the second computer program of the present invention can also adopt various aspects.

The above object of the present invention can be also achieved by a first computer program product in a computer-readable medium for tangibly embodying a program of instructions executable by a computer provided in the above-mentioned first information recording apparatus of the present invention (including its various aspects), to make the computer function as at least one portion of the controlling device, the calculating device, and the writing device.

According to the first computer program product of the present invention, at least one portion of the controlling device, the calculating device, and the writing device of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the controlling device, the calculating device, and the writing device of the present invention described above.

The above object of the present invention can be also achieved by a second computer program product in a computer-readable medium for tangibly embodying a program of instructions executable by a computer provided in the above-mentioned second information recording apparatus of the present invention (including its various aspects), to make the computer function as at least one portion of the controlling device, the calculating device, and the writing device.

According to the second computer program product of the present invention, at least one portion of the controlling device, the calculating device, and the writing device of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as at least one portion of the controlling device, the calculating device, and the writing device of the present invention described above.

These effects and other advantages of the present invention become more apparent from the following embodiments. As explained above, according to the first, second, and third information recording media of the present invention, each of them is provided with: the first recording layer; the second recording layer; and the first buffer area formed in advance as the pre-recorded area, so that it is possible to greatly reduce a time length required for the finalize process. Thus, it is possible to realize (i) the reduction of the recording operation time length and (ii) user's comfortable use.

Moreover, according to the first and second information recording apparatuses of the present invention, each of them is provided with: the writing device: the calculating device; and the controlling device, and according to the first and second information recording methods of the present invention, each of them is provided with: the calculating process; and the controlling process, so that it is possible to greatly reduce a time length required for the finalize process. Thus, it is possible to realize (i) the reduction of the recording operation time length and (ii) user's comfortable use. Moreover, according to the first and second computer programs of the present invention, each of them makes the computer function as the above-mentioned information recording apparatus of the present invention, so that it is possible to greatly reduce a time length required for the finalize process. Thus, it is possible to realize (i) the reduction of the recording operation time length and (ii) user's comfortable use.

BRIEF DESCRIPTION OF DRAWINGS

FIG. 3 is a table showing the classification of the data of land pre-pits recorded in a lead-in area of an L0 layer of the optical disc in the first embodiment of the information recording medium of the present invention.

FIG. 4 is a table showing the arrangement and ECC block address in the lead-in area of the land pre-pits in the L0 layer of the optical disc which adopts the opposite method, in the first embodiment of the information recording medium of the present invention.

FIG. 5 is a table and the like showing the detailed structure of the data of the land pre-pits with a field identification number (Field ID) of ID#1, which are recorded into the lead-in areas of the L0 layer and an L1 layer of the optical disc in the first embodiment of the information recording medium of the present invention.

FIG. 8 are a schematic conceptual view (FIG. 8(a)) showing the recording areas of the L0 layer and the L1 layer in the case where the lead-out area is formed of embosses or the like in the first embodiment of the information recording medium of the present invention and a schematic conceptual view (FIG. 8(b)) showing the recording areas of the L0 layer and the L1 layer in the case where at least one portion of the lead-out areas is not formed of embosses or the like in a comparison example, corresponding to each step in FIG. 7.

FIG. 10 are a schematic structure diagram (FIG. 10(a)) showing one specific example of linking in an opposite direction to the recording track path in a linking position in the sector, performed by the information recording/reproducing apparatus in the embodiment of the information recording apparatus of the present invention, and a schematic conceptual view (FIG. 10(b)) showing a position where the linking is performed.

DESCRIPTION OF REFERENCE CODES

100 ... Optical disc, 101-0 (101-1) ... Lead-in area, 102-0 (102-1) ... Data area, 103-0 (103-1, 103-0a and 103-1a) ... Lead-out area, 104-0 (104-1, 104-0a and 104-1a) ... Middle area, 106 ... Transparent substrate, 300 ... Information recording/reproducing apparatus, 306 ... Data input/output control device, 307 ... Operation control device, 310 ... Operation button, 311 ... Display panel, 351 ... Spindle motor, 352 ... Optical pickup, 353. Signal recording/reproducing device, 354 ... CPU (drive control device), 355 ... Memory, LB ... Laser light, FSA ... File system area, SY0 (SY5) ... Synchronization signal, R1 (R2 and R3) .... Link portion

BEST MODE FOR CARRYING OUT THE INVENTION

Hereinafter, the best mode for carrying out the invention will be explained in each embodiment in order, with reference to the drawings.

First Embodiment of Information Recording Medium

Firstly, with reference to FIG. 1 to FIG. 5, a first embodiment of the information recording medium of the present invention will be explained in detail.

Figure 1:
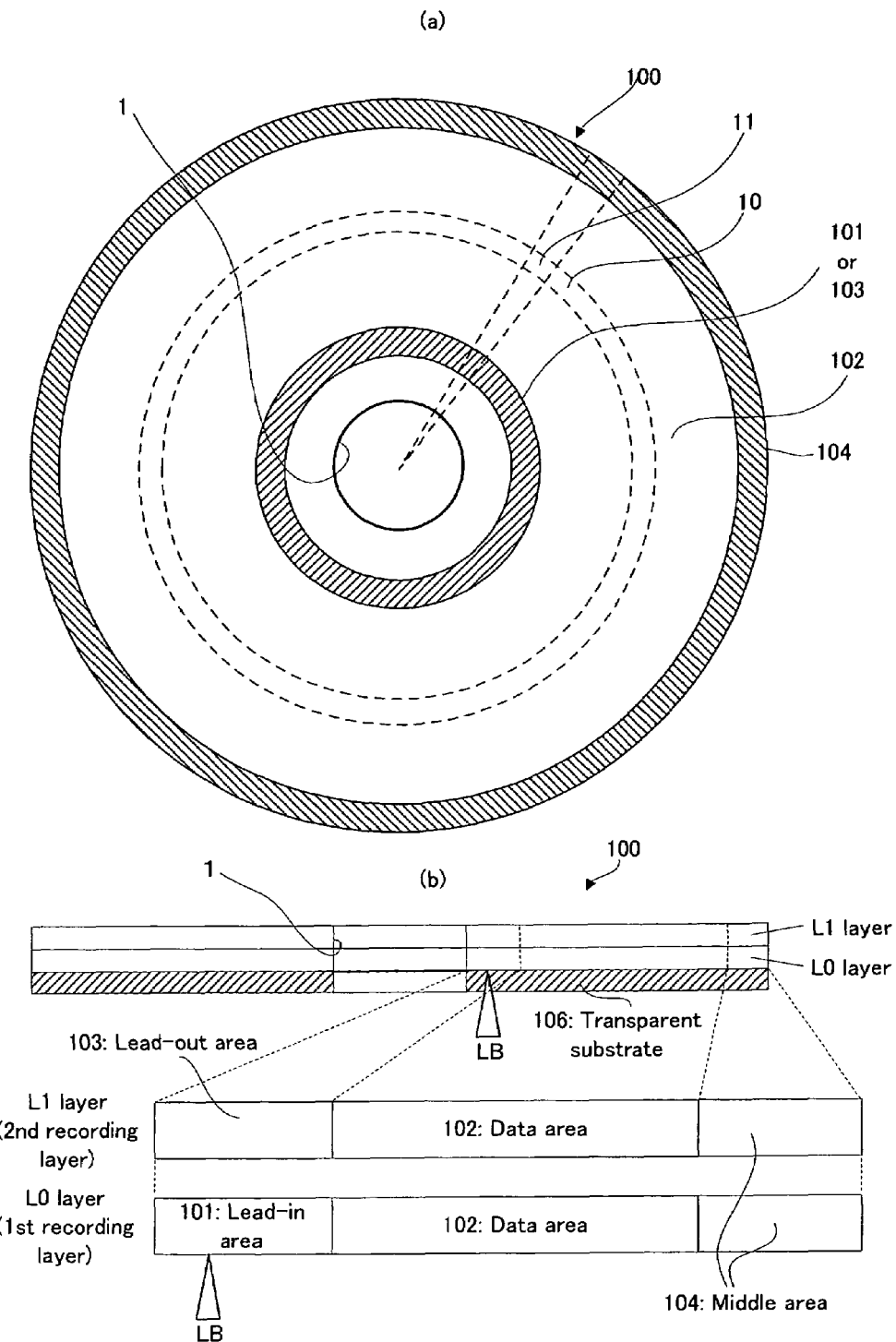
FIG. 1 are a substantial plan view (FIG. 1(a)) showing the basic structure of an optical disc having a plurality of recording areas, in a first embodiment of the information recording medium of the present invention, and a schematic cross sectional view of the optical disc and a corresponding conceptual view (FIG. 1(b)) showing a recording area structure in the radial direction.

Firstly, with reference to FIG. 1, the basic structure of an optical disc in the first embodiment of the information recording medium of the present invention will be discussed. FIG. 1(a) is a substantial plan view showing the basic structure of the optical disc having a plurality of recording areas, in the first embodiment of the information recording medium of the present invention, and FIG. 1(b) is a schematic cross sectional view of the optical disc and a corresponding conceptual view showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a center hole 1 as the center; a lead-in area 101; a data area 102; and a lead-out area 103 or a middle area 104. Then, for example, on a transparent substrate 106 of the optical disc 100, there are laminated recording layers or the like. In each recording area of the recording layers, a track or tracks 10, such as a groove track and a land track, are alternately placed, spirally or concentrically, centered on the center hole 1, for example. On the track 10, data is divided and recorded by a unit of ECC block 11. The ECC block 11 is a data management unit by a pre-format address in which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

In particular, the optical disc 100 in the embodiment, as shown in FIG. 1(b), has such a structure that an L0 layer and an L1 layer, which constitute one example of the "first and second record layers" of the present invention as descried later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the lower to upper side in FIG. 1(b). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Incidentally, a recording/reproducing procedure by an opposite method and a parallel method on the two-layer type optical disc and the data structure of each layer will be discussed later.

Figure 2:
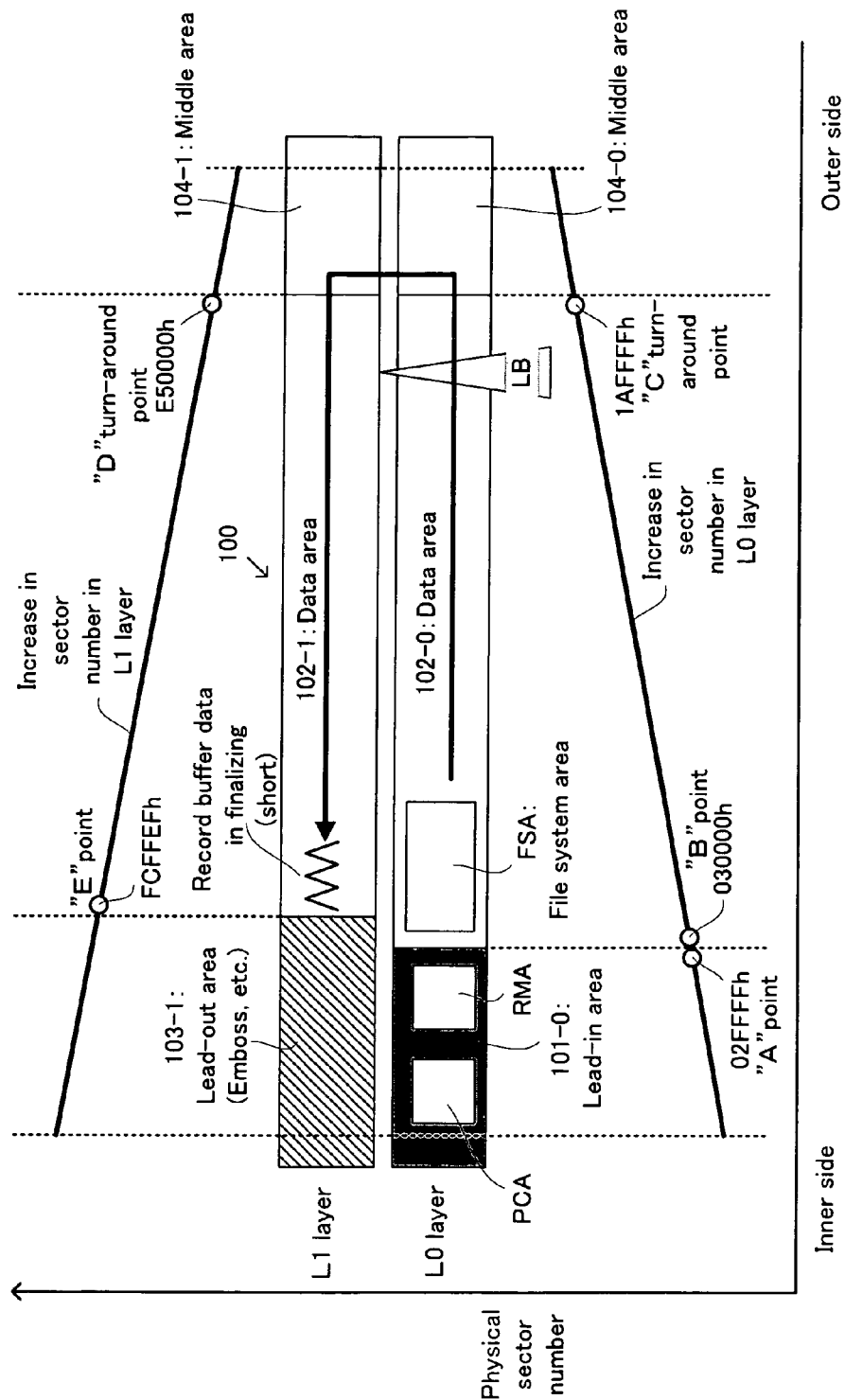
FIG. 2 is a conceptual graph showing the data structure of a two-layer type optical disc in the first embodiment of the information recording medium of the present invention, a physical sector number of sectors constituting an ECC block in the recording areas of the optical disc, and a recording or reproducing method by an opposite method of the optical disc.

Next, with reference to FIG. 2, an explanation will be given for (i) the data structure of the two-layer type optical disc in the first embodiment of the information recording medium of the present invention, (ii) a physical sector number of sectors constituting the ECC block in the recording areas of the optical disc, and (iii) the recording or reproducing procedure by the opposite method of the optical disc. The physical sector number herein (hereinafter referred to as a sector number, as occasion demands) is position information indicating an absolute physical address in the recording areas of the optical disc. Moreover, FIG. 2 is a conceptual graph showing (i) the data structure of the two-layer type optical disc in the first embodiment of the information recording medium of the present invention, (ii) the physical sector number of sectors constituting the ECC block in the recording areas of the optical disc, and (iii) the recording or reproducing method by the opposite method of the optical disc. Incidentally, the vertical axis indicates the sector number expressed in hexadecimal numbers, and the horizontal axis indicates a relative position in the radial direction of the optical disc.

As shown in FIG. 2, the two-layer type optical disc 100 in the first embodiment of the information recording medium of the present invention is provided with: the above-mentioned transparent substrate; and two recording layers laminated on the transparent substrate, i.e. the L0 layer and the L1 layer.

Specifically, the L0 layer is provided with: a lead-in area 101-0; a data area 102-0; and a middle area 104-0, from the inner to the outer circumferential side. The lead-in area 101-0 is provided with: (i) a PC (Power Calibration) area PCA for an OPC (Optimum Power Calibration) process, and (ii) a RM (Recording Management) area RMA in which recording management information is recorded and which constitutes one example of the "control data zone" of the present invention, and the like. Moreover, in the data area 102-0, there is provided a file system area FSA to record therein a file system for a host computer managing the position information or the like of a recorded area, for example. Moreover, the middle area 104-0 has a basic function of preventing the recording or reproduction position with respect to the L0 layer and the L1 layer from deviating to the outside of the substrate. It also has a function, as a so-called "jump buffer area", which is to prevent the recording or reproduction position from deviating to the outside of the substrate, in the layer jump.

On the other hand, the L1 layer is provided with: a middle area 104-1; a data area 102-1; and a lead-out area 103-1 which constitutes one example of the "first buffer area" of the present invention, from the outer to the inner circumferential side. A not-illustrated OPC area or the like may be also provided in the lead-out area 103-1.

In particular, the lead-out area 103-1 is formed in advance, as a pre-recorded area, of embossed pits (or which is made of embossed pits) in the case of a DVD-RW, for example, or of pits (or which is made of pits) obtained by irradiation of recording laser in the case of a DVD-R. Moreover, the lead-out area 103-1 may have a length in the radial direction of 0.5 mm or more. In addition, the "identification information" of the present invention and the "start address information" of the present invention are recorded in the RM area RMA, wherein the identification information indicates that the lead-out area 103-1 is formed in advance, and the start address information indicates the start position of the lead-out area 103-1 formed in advance.

The two-layer type optical disc 100 is constructed in the above manner, so that in the recording or reproduction of the optical disc 100, the laser light LB is irradiated from the side of a not-illustrated substrate, i.e., from the lower to the upper side in FIG. 2, by a not-illustrated optical pickup of an information recording/reproducing apparatus related to the information recording apparatus of the present invention described later, and the focal distance (or focus distance) thereof or the like is controlled. At the same time, the travel distance and direction in the radial direction of the optical disc 100 are controlled. By this, the data is recorded into each recording layer, or the recorded data is reproduced. More specifically, in the L0 layer, the record information, such as contents, is recorded, and subsequently, a predetermined amount of buffer data is written as one portion of the middle area 104-0 of the L0 layer. Then, after the layer jump from the middle area 104-0 of the L0 layer to the L1 layer, a predetermined amount of buffer data is written as one portion of the middle area 104-1 of the L1 layer, and subsequently, the record information is recorded into the L1 layer.

In particular, the opposite method is adopted as the recording or reproducing procedure of the two-layer type optical disc in the first embodiment of the information recording medium of the present invention. More specifically, the opposite method herein is such a method that the optical pickup of the information recording/reproducing apparatus described later is displaced from the inner to the outer circumferential side, i.e. in a direction of a right-pointing arrow in FIG. 2, in the L0 layer, as the recording or reproducing procedure of the two-layer type optical disc, whereas the optical pickup is displaced from the outer to the inner circumferential side, i.e. in a direction of a left-pointing arrow in FIG. 2, in the L1 layer, to thereby perform the recording or reproduction on the two-layer type optical disc. In the opposite method, if the recording or reproduction is ended in the L0 layer, the optical pickup, located on the outermost circumference, does not need to be displaced again to the innermost circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel method. This is why the opposite method is adopted in the recording of a large volume of content information.

Specifically, firstly, in the L0 layer, as the optical pickup is displaced in the lead-in area 101-0, the data area 102-0, and the middle area 104-0, from the inner to the outer circumferential side, the sector number in the recording areas of the optical disc 100 increases. More specifically, the optical pickup sequentially accesses the end position of the lead-in area 101-0 with a sector number of "02FFFFh" (refer to an A point in FIG. 2), the start position of the data area 102-0 with a sector number of "030000h" (refer to a B point in FIG. 2), and the end position of the data area 102-0 with a sector number of "1AFFFFh" (hereinafter referred to as a "turn-around point" in the L0 layer, as occasion demands: refer to a C point in FIG. 2), and the optical pickup is displaced to the middle area 104-0 which functions as the buffer, by which the recording or reproduction is performed in the L0 layer. Incidentally, in the embodiment, "h" at the tail of "30000h" or the like indicates that it is expressed in hexadecimal numbers. On the other hand, in the L1 layer, specifically, as the optical pickup is displaced in the middle area 104-1, the data area 102-1, and the lead-out area 103-1 from the outer to the inner circumferential side, the sector number in the recording areas of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 2), and the end position of the data area 102-1 with a sector number of "FCFFEFh" (refer to an E point in FIG. 2), and the optical pickup is displaced to the lead-out area 103-1, by which the recording or reproduction is performed in the L1 layer.

All the sector numbers in the L0 layer and the L1 layer explained above have a 15's complement number relationship in hexadecimal numbers. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal number to a binary number of "000110101111111111111111", inverting the bits to "111001010000000000000000", and reconverting it to the "E50000h" in the hexadecimal number.

Thus, the content information is recorded or reproduced at the same time that the optical pickup is continuously displaced, in the sector numbers of "030000h" to "1AFFFFh" of the data area 102-0 in the L0 layer and the sector numbers of "E50000h" to "FCFFEFh" of the data area 102-1 in the L1 layer, for example.

With respect to the physical sector number explained above, a Logical Block Address (LBA) is assigned, one to one. More specifically, for example, a "000000" LBA corresponds to the sector number of "030000h", and a "30FFEF" LBA corresponds to the sector number of "FCFFEFh". Thus, for example, a host computer can perform the recording and reproduction operations in accordance with the logical block address managed by a file system, for example, without being aware of the physical sector number.

Consequently, according to the first embodiment of the information recording medium of the present invention, in the finalize process in the case where, for example, the last information out of the record information is written or has written by the optical pickup or the like of the information recording apparatus described later, it is only necessary to add the buffer data up to the start position of the lead-out area 103-1 with a length in the radial direction of 0.5 mm or more, for example, which is formed in advance as the pre-recorded area in the inner circumferential edge portion of the L1 layer, from the end position of the written last information. Thus, it is possible to omit the adding of the buffer data into the entire lead-out area 103-1 at the time of the finalize process, and it is possible to greatly reduce a time length required for the finalize process. Thus, it is possible to realize (i) the reduction of the recording operation time length and (ii) user's comfortable use.

In addition, in the two-layer type optical disc in the first embodiment of the information recording medium of the present invention, the length in the radial direction of the lead-out area 103-1 is greater than that of the lead-in area 101-0. Thus, it is possible to reduce a time length of recording the buffer data from the recording end portion of actual data to the lead-out area 103-1 in the L1 layer, for example, at the time of the finalize process, wherein the reduction in the first embodiment is greater than in a second embodiment described later, because the length in the radial direction of the lead-out area 103-1 is greater than that of the lead-in area 101-0.

Next, with reference to FIG. 3 to FIG. 5, an explanation will be given for the type of the data of land pre-pits recorded in the lead-in area of the L0 layer of the optical disc in the first embodiment of the information recording medium of the present invention, which adopts the opposite method, the arrangement in the lead-in area of the land pre-pits, and whether or not the lead-out area is formed in advance as the pre-recorded area, and the principle in which the start address of the lead-out area is identified by the land pre-pits.

Firstly, with reference to FIG. 3, an explanation will be given for the type of the data of land pre-pits recorded in the lead-in area of the L0 layer of the optical disc in the first embodiment of the information recording medium of the present invention. FIG. 3 is a table showing the classification of the data of land pre-pits recorded in the lead-in area of the L0 layer of the optical disc in the first embodiment of the information recording medium of the present invention. Incidentally, this table shows a field identification number (Field ID), information to be recorded (Content), and a recording position (Location), from the left column.

As shown in FIG. 3, the data of the land pre-pits recorded in the lead-in area of the L0 layer is classified into ID#0 to ID#18, by using the field identification number (Field ID).

In the land pre-pits identified by ID#0, information about an ECC (Error Correcting Code) block address is recorded. The land pre-pits are located in all the recording areas of the optical disc. Here, the ECC block address is an error-correctable recording unit, i.e., position information based on the ECC block.

In the land pre-pits identified by ID#1, information, such as the start address of the lead-out area, which constitutes one example of the "start address information" of the present invention described later, and extended information, is recorded. The land pre-pits are located in the lead-in area of the optical disc. Hereinafter, the land pre-pits identified by ID#1 to ID#18 are located in the lead-in area of the optical disc.

In the land pre-pits identified by ID#2 and ID#5, strategy information for 1× for L1 layer is recorded, for example. The land pre-pits are located in the lead-in area of the optical disc.

In the land pre-pits identified by ID#3 and ID#4, information of a manufacturer's identification number is recorded, for example.

In the land pre-pits identified by ID#6, information, other information is recorded in the lead-in area of the L0 layer of the optical disc.

In the land pre-pits identified by ID#7 and ID#10, strategy information for 1× for L0 layer is recorded, for example, in the lead-in area of the L0 layer of the optical disc.

In the land pre-pits identified by ID#8 and ID#9, information of a manufacturer's identification number is recorded, for example, in the lead-in area of the L0 layer of the optical disc.

In the land pre-pits identified by ID#11 and ID#12, strategy information for 2× for L0 layer is recorded, for example, in the lead-in area of the L0 layer of the optical disc.

In the land pre-pits identified by ID#13 to ID#18, strategy information for 4× for L0 layer is recorded, for example, in the lead-in area of the L0 layer of the optical disc.

Next, with reference to FIG. 4, an explanation will be given for the arrangement in the lead-in area of the land pre-pits in the L0 layer of the optical disc which adopts the opposite method, in the first embodiment of the information recording medium of the present invention. FIG. 4 is a table showing the arrangement and ECC block address in the lead-in area of the land pre-pits in the L0 layer of the optical disc which adopts the opposite method, in the first embodiment of the information recording medium of the present invention. Incidentally, this table shows the field identification number, the recording position, and the ECC block address, from the left column.

As shown in FIG. 4, the land pre-pits identified by the field identification numbers of ID#1 to ID#18 or ID#0 are periodically recorded in the lead-in area in the L0 layer. These land pre-pits are located at ECC block addresses of "FFDD05h" to "FFCFFFh", for example.

Next, with reference to FIG. 5, an explanation will be given for whether or not the lead-out area is formed in advance as the pre-recorded area, of the land pre-pits recorded in the lead-in area of the L0 layer of the optical disc in the first embodiment of the information recording medium of the present invention, which adopts the opposite method, and the principle in which the start address of the lead-out area is identified if the lead-out area is formed in advance. FIG. 5 is a table and the like showing the detailed structure of the data of the land pre-pits with a field identification number (Field ID) of ID#1, which are recorded into the lead-in areas of the L0 layer and the L1 layer of the optical disc in the first embodiment of the information recording medium of the present invention.

As shown in FIG. 5, the data expressed by a binary bit string in a matrix of 16 rows×13 columns is recorded in ID#1. The bit in the "1"st column is a SYNC bit, i.e., a bit for synchronization. The bits in the "2"nd to the "5"th columns are a bit string with the data type recorded. In the bits in the "6"th to the "13"th columns, the actual data is recorded.

Specifically, the data with the data type of "0000" to "0010" means a relative block address, and the data with the data type of "0011" to "0101" means parity. The latter half of the data with the data type of "1100", i.e. the data in the "10"th to "13"th columns, means extended information.

In particular, the data with the data type of "1001" to "1011" means the start address of the lead-out area. If the start address of the lead-out area is "00h", it may indicate that the lead-out area is not formed in advance as the pre-recorded area.

The start address of the lead-out area, recorded in the land pre-pits with the field identification number of ID#1, as described above, is read by the information recording/reproducing apparatus described later. By this, it is possible to identify whether or not the lead-out area is formed in advance as the pre-recorded area, and if it is formed in advance, it is possible to identify the start address of the lead-out area.

Incidentally, the extended information recorded in the land pre-pits with the field identification number of ID#1, shown in FIG. 5, is read by the information recording/reproducing apparatus described later. By this, a recordable maximum speed and an optimum recording condition in the L0 layer and the L1 layer can be selected. Specifically, as shown in the lower part of FIG. 5, if the extended information recorded in the land pre-pits with the field identification number of ID#1 in the L0 layer is set to "0011", the extended information is read by the information recording/reproducing apparatus, so that the maximum field identification number is "ID#18". Moreover, as explained in FIG. 3 and FIG. 4, the strategy information for 1× can be selected for the L1 layer, and simultaneously, the strategy information for 1×, 2×, or 4× can be selected for the L0 layer.

(Information Recording/Reproducing Apparatus According to Embodiment of Information Recording Apparatus)

Figure 6:
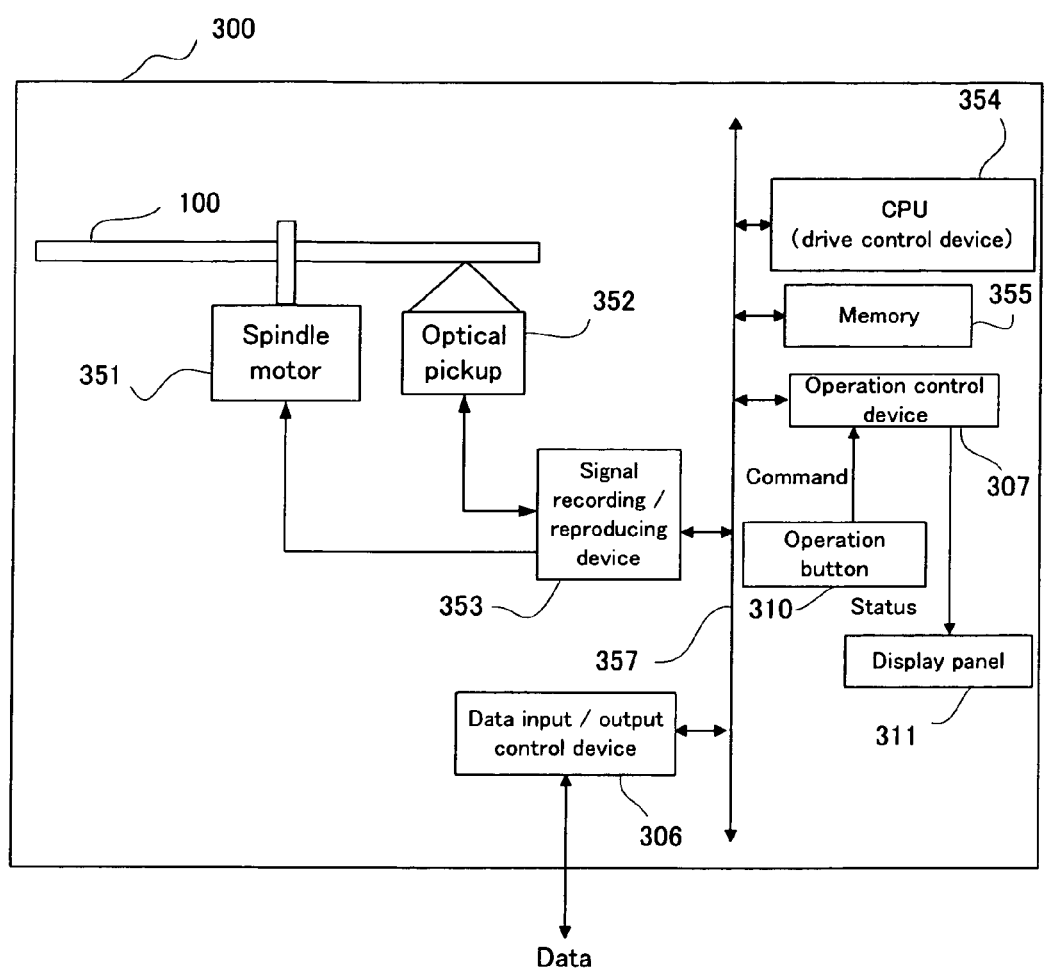
FIG. 6 is a block diagram showing an information recording/reproducing apparatus in an embodiment of the information recording apparatus of the present invention.

Firstly, with reference to FIG. 6, an explanation will be given for the structures of an information recording/reproducing apparatus 300 in an embodiment of the information recording apparatus of the present invention and a host computer 400. FIG. 6 is a block diagram showing the information recording/reproducing apparatus according to the embodiment of the present invention, and the host computer. Incidentally, the information recording/reproducing apparatus 300 has a function of recording the record data onto the optical disc 100 and a function of reproducing the record data recorded on the optical disc 100.

With reference to FIG. 6, the inner structure of the information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit).

The information recording/reproducing apparatus 300 is provided with: the optical disc 100; a spindle motor 351; an optical pickup 352; a signal recording/reproducing device 353; a CPU (drive control device) 354; a memory 355; a data input/output control device 306; an operation control device 307; an operation button 310; a display panel 311; and a bus 357.

Particularly, a disc drive (hereinafter referred to as a drive, as occasion demands) may be constructed from the spindle motor 351, the optical pickup 352, the signal recording/reproducing device 353, the CPU (drive control device) 354, and the memory 355, which are described in the former half. Moreover, a host computer may be constructed from the data input/output control device 306, the operation control device 307, the operation button 310, and the display panel 311, which are described in the latter half. Alternatively, moreover, a communication device may be constructed from the CPU (drive control device) 354 and the bus 357.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is intended to perform the recording/reproduction with respect to the optical disc 100, and is provided with a semiconductor laser device, a lens, and the like. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power in the recording and reproduction processes for the OPC pattern, together with a not-illustrated timing generator or the like, under the CPU 354, upon the OPC (Optimum Power Calibration) process. In particular, the signal recording/reproducing device 353 constitutes one example of the "writing device" of the present invention, together with the optical pickup 352.

The memory 355 is used in the general data processing and the OPC process or the like on the information recording/reproducing apparatus 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer used for compression/decompression (or encoding/decoding) of video data; a RAM area into which a parameter required for the operation of the firmware program or the like is stored; and the like.

The CPU (drive control device) 354 is connected to the signal recording/reproducing device 353 and the memory 355 through the bus 357, and controls the entire information recording/reproducing apparatus 300 by giving an instruction to various controlling devices. In general, software or firmware for operating the CPU 354 is stored in the memory 355. In particular, the CPU 354 constitutes one example of the "controlling device" of the present invention, together with the memory 355.

The data input/output control device 306 controls the input/output of the data from the exterior with respect to the information recording/reproducing apparatus 300, to thereby perform storage to and export from the data buffer on the memory 355. If the input/output of the data is a video signal, the data input/output control device 306 compresses (encodes) the data received from the exterior in a MPEG format, for example, and outputs it to the memory 355, upon data inputting. Upon data outputting, it decompresses (decodes) the encoded data in the MPEG format or the like received from the memory 355, and outputs it to the exterior.

The operation control device 307 receives an operation instruction and performs display with respect to the information recording/reproducing apparatus 300, and transmits an instruction by the operation button 310, such as an instruction to record or reproduce, to the CPU 354, and outputs the operation state of the information recording/reproducing apparatus 300, such as during recording and during reproduction, to the display panel 311, such as a fluorescent tube. In particular, in the embodiment, the operation control device 307 may be provided with a not-illustrated CPU and memory or the like, as the host computer of the present invention.

One specific example of the information recording/reproducing apparatus 300, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 355, on the CPU 354.

(Flow of Recording Operation Performed by Information Recording Apparatus of Invention)

Next, with reference to FIG. 7 and FIG. 8, an explanation will be given for a flow of the recording operation in the case where an additional recording operation in the L0 layer and the L1 layer, the recording of the middle area, and the finalize process are performed by the information recording/reproducing apparatus in the embodiment of the information recording apparatus of the present invention, and a transition in the recording areas of the L0 layer and the L1 layer.

Figure 7:
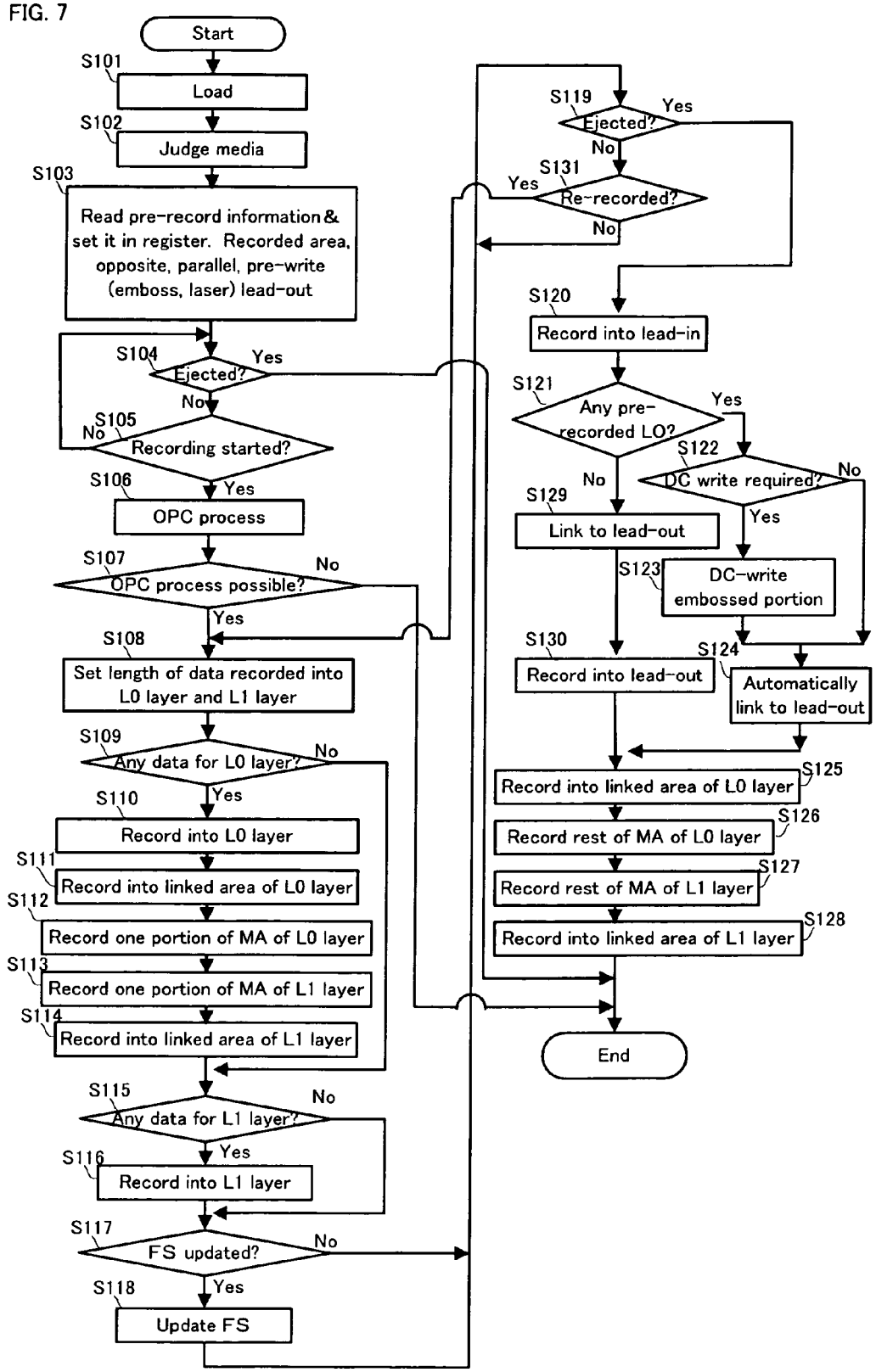
FIG. 7 is a flowchart showing a flow of a recording operation for the optical disc in the case where a middle area is recorded, on the information recording/reproducing apparatus in the embodiment of the information recording apparatus of the present invention.

FIG. 7 is a flowchart showing a flow of the recording operation for the optical disc in the case where the middle area is recorded, on the information recording/reproducing apparatus in the embodiment of the information recording apparatus of the present invention. FIG. 8 are a schematic conceptual view (FIG. 8(*a*)) showing the recording areas of the L0 layer and the L1 layer in the case where the lead-out area is formed of embosses or the like in the first embodiment of the information recording medium of the present invention and a schematic conceptual view (FIG. 8(*b*)) showing the recording areas of the L0 layer and the L1 layer in the case where the lead-out area is not formed of embosses or the like in a comparison example, corresponding to each step in FIG. 7. Incidentally, in FIG. 8, the right indicates the outer circumferential side, and the left indicates the inner circumferential side.

Firstly, in FIG. 7, the optical disc 100 is loaded (step S101). Then, under the control of the CPU 354, a seek operation is performed by the optical pickup 352, and the type of the optical disc, such as a DVD-R or RW, for example, is judged (step S102). More specifically, it is judged from the value of "Book Type" within the management information physically recorded in the control data zone, for example. Then, various management information necessary for the recording process with respect to the optical disc 100 is obtained (step S103). More specifically, by using the various management information, the address information of the recorded area, the number of recording layers, and whether or not the recording layer is of an opposite track path type, a parallel track path type, or a single layer type, are identified.

In particular, by using the various management information, whether or not the lead-out area is recorded in advance as the "pre-recorded area" of the present invention, whether the "pre-recorded area" is formed of embossed pits or pits obtained by the irradiation of recording laser, and the start address of the lead-out area, are identified.

Then, it is judged whether or not the optical disc is ejected (step S104). If it is not ejected (the step S104: No), moreover, it is judged whether or not an instruction to start the additional recording is given, for example, on the drive (step S105). Here, if the instruction to start the additional recording is given (the step S105: Yes), the OPC (Optimum Power Control) process of detecting an optimum recording laser power is performed (step S106). Then, it is judged whether or not the optimum recording laser power can be detected by the OPC process (step S107). If the optimum recording laser power can be detected (the step S107: Yes), the amount of information recorded into the L0 layer and the L1 layer is calculated, and the turn-around point in the L0 layer and the correspondence address in the L1 layer are calculated, under the control of the CPU 354 (step S108).

Then, it is judged whether or not there is the record information in the L0 layer (step S109). Here, if there is the record information in the L0 layer (the step S109: Yes), the additional recording is performed by a sector unit or ECC block unit, for example, in the L0 layer, by the information recording/reproducing apparatus (step S110). Incidentally, refer to a number "1" in a circle in FIG. 8(*a*) and FIG. 8(*b*). Then, dummy data is recorded into the ECC block including a linking position, on the boundary between the data area and the middle area in the L0 layer, for example (step S111). In particular, the details of the structure of the linking along the recording track path in the linking position described above, will be explained later in FIG. 9. Incidentally, refer to the boundary between the number "1" in a circle and a number "2" in a circle in FIG. 8(*a*) and FIG. 8(*b*). Then, the buffer data is added as one portion of the middle area of the L0 layer (step S112). Incidentally, refer to the number "2" in a circle in FIG. 8(*a*) and FIG. 8(*b*). Then, after the layer jump, the buffer data is added as one portion of the middle area of the L1 layer (step S113). Incidentally, refer to a number "3" in a circle in FIG. 8(*a*) and FIG. 8(*b*). Then, the dummy data is recorded into the ECC block including a linking position, on the boundary between the middle area and the data area in the L1 layer, for example (step S114). In particular, the details of the structure of the linking along the recording track path in the linking position described above, will be explained later in FIG. 9, as in the step S111. Incidentally, refer to the boundary between the number "3" in a circle and a number "4" in a circle in FIG. 8(*a*) and FIG. 8(*b*).

Then, it is judged whether or not there is the record information in the L1 layer (step S115). Here, if there is the record information in the L1 layer (the step S115: Yes), the additional recording is performed by the sector unit or ECC block unit, for example, in the L1 layer, by the information recording/reproducing apparatus (step S116). Incidentally, refer to the number "4" in a circle in FIG. 8(*a*) and FIG. 8(*b*).

Then, it is judged whether or not a file system in the data area is to be updated by the information recording/reproducing apparatus, for example (step S117). If the file system is to be updated (the step S117: Yes), the file system is updated by the information recording/reproducing apparatus (step S118).

Then, it is judged whether or not the optical disc is ejected (step S119). If it is ejected (the step S119: Yes), the finalize process is started, and firstly, the management information or the like is recorded into the lead-in area 101-1 (step S120). More specifically, the position information of the recorded area, for example, (i) the position information about a position where a border-out is started for recording, or (ii) the position information about a position where a border-in is started for subsequently recording, for example, is recorded into the lead-in area 101-0.

Then, under the control of the CPU 354, it is judged whether or not the lead-out area is formed in advance as the pre-recorded area, of embossed pits or of pits obtained by the irradiation of recording laser (step S121). If the lead-out area is formed in advance as the pre-recorded area, of embossed pits or of pits obtained by the irradiation of recording laser (the step S121: Yes), moreover, it is judged whether or not the irradiation with a laser power at a DC level lower than a reproduction laser power, i.e. so-called DC write, is required for the lead-out area formed in advance of embossed pits as the pre-recorded area (step S122). Here, if the DC write is required for the lead-out area formed in advance of embossed pits as the pre-recorded area (the step S122: Yes), the DC write is performed on the lead-out area formed in advance of embossed pits as the pre-recorded area, (step S123).

Then, the lead-out area formed in advance of embossed pits as the pre-recorded area, and the recording area of the L1 layer are automatically linked (step S124).

Then, the dummy data is recorded into the ECC block including a linking position, on the boundary between one portion of the middle area and the remaining one portion of the middle area in the L0 layer, for example (step S125). In particular, the details of the structure of the linking along the recording track path in the linking position described above, will be explained later in FIG. 9, as in the step S111. Incidentally, refer to the boundary between the number "2" in a circle and a number "7" in a circle in FIG. 8(*a*) and FIG. 8(*b*). Then, the buffer data is added to the remaining one portion of the middle area of the L0 layer (step S126). Incidentally, refer to the number "7" in a circle in FIG. 8(*a*) and FIG. 8(*b*). Then, after the layer jump, the buffer data is added to the remaining one portion of the middle area of the L1 layer (step S127). Incidentally, refer to a number "8" in a circle in FIG. 8(*a*) and FIG. 8(*b*). Then, the dummy data is recorded into the ECC block including a linking position, on the boundary between one portion of the middle area and the remaining one portion of the middle area in the L1 layer, for example (step S128). In particular, the details of the structure of the linking in the opposite direction to the recording track path in the linking position described above, will be explained later in FIG. 10. Incidentally, refer to the boundary between the number "8" and the number "3" in a circle in a circle in FIG. 8(*a*) and FIG. 8(*b*).

On the other hand, as a result of the judgment in the step S121, if the lead-out area is not formed in advance as the pre-recorded area, of embossed pits or of pits obtained by the irradiation of recording laser (the step S121: No), the dummy data is recorded into the ECC block including a linking position, on the boundary between the data area and the lead-out area in the L1 layer, for example (step S129). In particular, the details of the structure of the linking along the recording track path in the linking position described above, will be explained later in FIG. 9, as in the step S111. Incidentally, refer to the boundary between the number "4" in a circle and a number "6" in a circle in FIG. 8(*b*). Then, the buffer data is added to the lead-out area in the L1 layer (step S130). Incidentally, refer to the number "6" in a circle in FIG. 8(*b*).

On the other hand, as a result of the judgment in the step S119, if the optical disc is not ejected (the step S119: No), moreover, it is judged whether or not an instruction to perform re-recording is given, on the information recording/reproducing apparatus (step S131). If the instruction to perform re-recording is given (the step S131: Yes), the operational flow returns to the step S108. On the other hand, if the instruction to perform re-recording is not given (the step S131: No), it returns to the step S119.

As described above, a series of sequential recording is ended.

Figure 9:
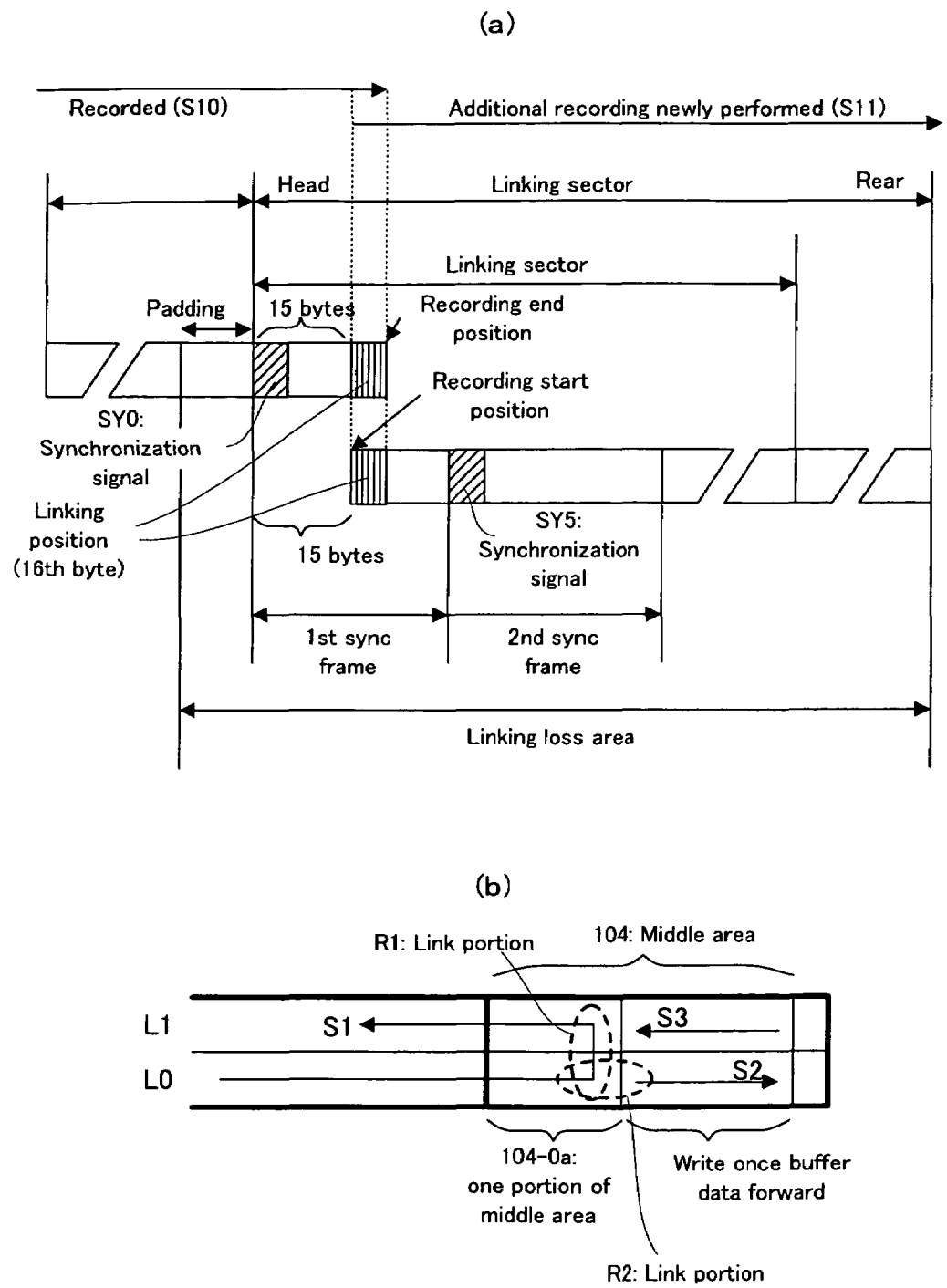
FIG. 9 are a schematic structure diagram (FIG. 9(a)) showing one specific example of linking along a recording track path in a linking position in a sector, performed by the information recording/reproducing apparatus in the embodiment of the information recording apparatus of the present invention, and a schematic conceptual view (FIG. 9(b)) showing a position where the linking is performed.

Next, with reference to FIG. 9, an explanation will be given for the details of one specific example of the linking along the recording track path in a linking position in a sector, performed by the information recording/reproducing apparatus in the embodiment of the information recording apparatus of the present invention. FIG. 9 are a schematic structure diagram (FIG. 9(*a*)) showing one specific example of linking along a recording track path in the linking position in the sector, performed by the information recording/reproducing apparatus in the embodiment of the information recording apparatus of the present invention, and a schematic conceptual view (FIG. 9(*b*)) showing a position where the linking is performed. Incidentally, FIG. 9(*b*) shows the linking in the positions of the middle area 104; however, this linking is applied to all the recording areas, such as the lead-in area or the data area.

As shown in FIG. 9(*a*), if additional recording (refer to step S11) is newly performed behind a recorded area (refer to step S10), the linking (overwriting) is performed in the linking position in the sector. More specifically, it is mostly an unrecorded area, and information is already recorded up to a "16"th byte in a first sync frame out of 26 sync frames in the linking sector located at the head of 1 ECC block (16 sectors) where the additional recording is newly performed. Now, if additional recording is newly performed, the additional recording is started from between a "15"th byte and a "17"th byte in the first sync frame of this linking sector, for example, from the "16"th byte.

As described above, the 16th byte in the first sync frame of the linking sector located at the head of 1 ECC block is an area overwritten by the additional recording newly performed, and is referred to as the linking position. More specifically, a linking sector with an information amount of 2 KB, for example, is provided with 26 sync frames, and each sync frame is provided with a "32" channel bit synchronization signal portion and a "1488" channel bit data portion. There are 8 types of synchronization signals, such as "SY0" and "SY5", in FIG. 9(*a*), and a unique pair of sync frames can be specified by combining two of the synchronization signals. Thus, the information recording/reproducing apparatus can control in which position the recording is performed in 1 sector.

The linking along the recording track path in the above manner is also performed when the additional recording is performed in the layer jump from the L0 layer to the L1 layer, as shown in FIG. 9(*b*) (refer to a link portion R1). Moreover, it is also performed when the buffer data is additionally recorded or written once along the recording track path, next to one portion 104*a*-0 of the middle area in the L0 layer (refer to a link portion R2).

Incidentally, according to the researchers of the present invention, the additional recording by a unit of mark pit can be realized, but it is preferably not performed. This is because it is better to consider uncertainty of a mark pit shape due to heat conduction in the beginning and in the end of the recording, and a certain degree of margin for the information recording apparatus. Moreover, a shift or deviation in the area to be overwritten or a writing error, caused by a discrepancy in a recording clock unit, is error-corrected by an ECC (Error Correcting Code). Moreover, the additional recording is preferably not performed in the channel bit synchronization signal portion (or the portion of the synchronization signal of the channel bit), nor in the data portion located just before the synchronization signal portion. This is because if the above-mentioned various margins are considered, the writing error likely occurs, and even in that case, the error correction is performed by the ECC in the same manner. In particular, the synchronization signal portion is closely related to a control operation, so that the linking in the synchronization signal portion is not performed on a DVD, according to the standard.

Next, with reference to FIG. 10, an explanation will be given for the details of one specific example of the structure of the linking in the opposite direction to the recording track path in the linking position in the sector by the information recording/reproducing apparatus in the embodiment of the information recording apparatus of the present invention. Here, FIG. 10 are a schematic structure diagram (FIG. 10(*a*)) showing one specific example of the linking in the opposite direction to the recording track path in the linking position within the sector, performed by the information recording/reproducing apparatus in the embodiment of the information recording apparatus of the present invention, and a schematic conceptual view (FIG. 10(*b*)) showing a position where the linking is performed. Incidentally, FIG. 10(*b*) shows the linking in the position of the middle area 104; however, as in the explanation of the above-mentioned FIG. 9(*b*), this linking can be applied to all the recording areas, such as the lead-in area or the data area.

As shown in FIG. 10(*a*), if additional recording (refer to step S21) is newly performed on the side of the head of a recorded area (refer to step S20), the linking (overwriting) is performed in the linking position in the sector. More specifically, it is mostly a recorded area, and information is already recorded after between a "15"th byte and a "17"th byte, for example, a "16"th byte, in a first sync frame out of 26 sync frames in the linking sector located at the head of 1 ECC block (16 sectors) where the additional recording is newly performed. Now, if additional recording is newly performed, the additional recording is performed up to the "16"th byte in the first sync frame of this linking sector, for example As described above, as in the above-mentioned FIG. 9, the 16th byte in the first sync frame of the linking sector located at the head of 1 ECC block is an area overwritten by the additional recording newly performed, and is referred to as the linking position.

The linking in the opposite direction to the recording track path is performed when the buffer data is written once in order in the direction opposite to the recording track path after the recording of one portion 104a-1 of the middle area in the L1 layer, as shown in FIG. 10(b) (refer to a link portion R3).

Second Embodiment of Information Recording Medium

Figure 11:
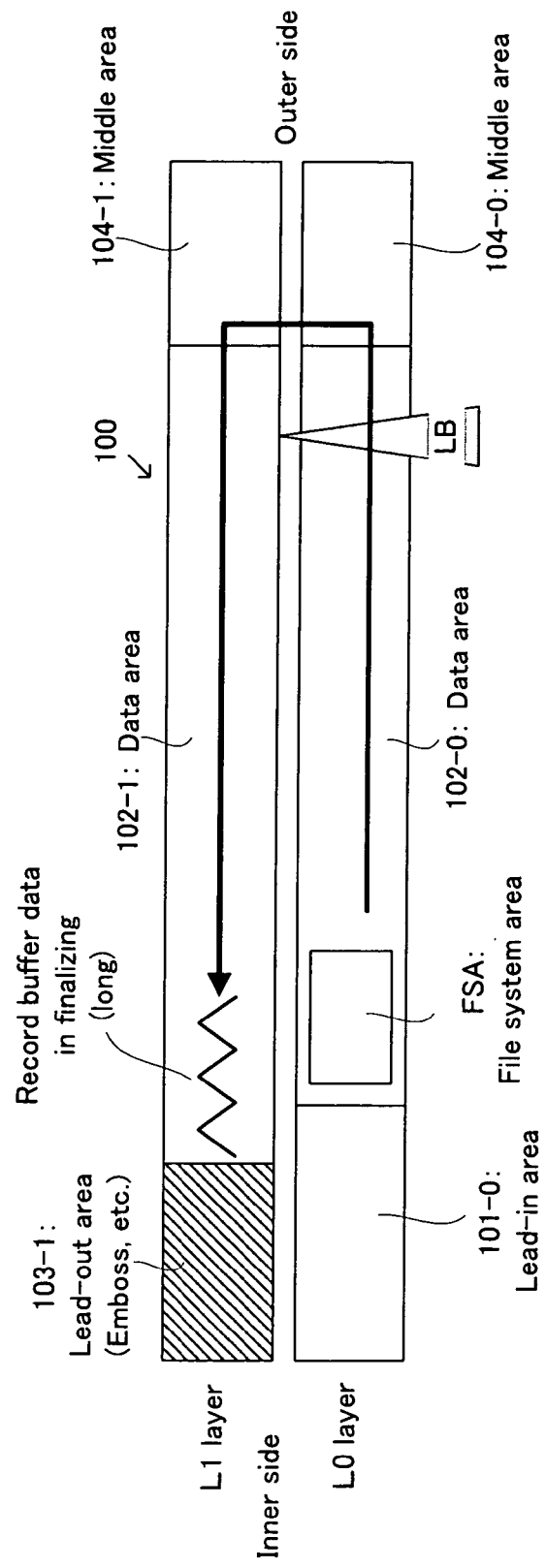
FIG. 11 is a conceptual view showing the data structure of a two-layer type optical disc in a second embodiment of the information recording medium of the present invention, and the recording or reproducing method by the opposite method of the optical disc.

Next, with reference to FIG. 11, an explanation will be given for (i) the data structure of a two-layer type optical disc in a second embodiment of the information recording medium of the present invention, and (ii) the recording or reproducing procedure by the opposite method of the optical disc. FIG. 11 is a conceptual view showing (i) the data structure of the two-layer type optical disc in the second embodiment of the information recording medium of the present invention, and (ii) the recording or reproducing method by the opposite method of the optical disc. In FIG. 11, the left indicates the inner circumferential side of the optical disc, and the right indicates the outer circumferential side of the optical disc.

The data structure of the two-layer type optical disc in the second embodiment of the information recording medium of the present invention, and the recording or reproducing method by the opposite method of the optical disc are substantially the same as those in the first embodiment explained with reference to FIG. 1 to FIG. 10.

In particular, in the two-layer type optical disc in the second embodiment of the information recording medium of the present invention, the length in the radial direction of the lead-out area 103-1 is less than that of the lead-in area 101-0. Thus, it is possible to reduce a time length of forming the lead-out area 103-1 in advance of embossed pits or pits obtained by the irradiation of recording laser, in a manufacturing process of manufacturing the optical disc.

Third Embodiment of Information Recording Medium

Figure 12:
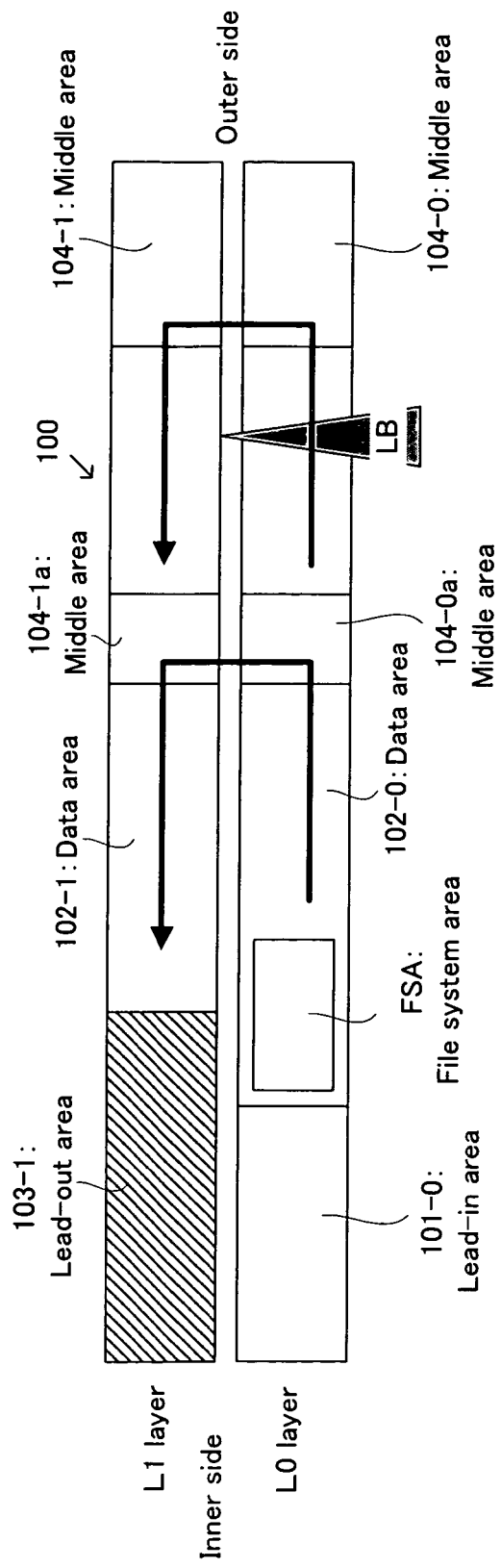
FIG. 12 is a conceptual view showing the data structure of a two-layer type optical disc in a third embodiment of the information recording medium of the present invention, and the recording or reproducing method by the opposite method of the optical disc.

Next, with reference to FIG. 12, an explanation will be given for (i) the data structure of a two-layer type optical disc in a third embodiment of the information recording medium of the present invention, and (ii) the recording or reproducing procedure by the opposite method of the optical disc. FIG. 12 is a conceptual view showing (i) the data structure of the two-layer type optical disc in the third embodiment of the information recording medium of the present invention, and (ii) the recording or reproducing method by the opposite method of the optical disc. In FIG. 12, the left indicates the inner circumferential side of the optical disc, and the right indicates the outer circumferential side of the optical disc.

The data structure of the two-layer type optical disc in the third embodiment of the information recording medium of the present invention, and the recording or reproducing method by the opposite method of the optical disc are substantially the same as those in the first embodiment explained with reference to FIG. 1 to FIG. 10.

In particular, in the two-layer type optical disc in the third embodiment of the information recording medium of the present invention, (i) the amount of information recorded into the L0 layer and (ii) the amount of information recorded into the L1 layer are made substantially equal, on the basis of (iii-1) the total information amount of the record information, (iii-2) the start address of the lead-out area 103-1 formed in advance as the pre-recorded area of embossed pits or pits obtained by the irradiation of recording laser, and (iii-3) the recording capacity of the L0 layer and the L1 layer, under the control of the above-mentioned CPU. Then, other middle areas 104-0a and 104-1a are formed by the recording of the buffer data, in the middle (e.g., half way) of the data areas 102-0 and 102-1. Thus, at the time of the finalize process, for example, by setting the outer circumferential side of the middle areas 104-0a and 104-1a to be in an unrecorded condition, i.e. in a mirror condition, on the basis of the total amount of the record information and the like, under the control of the CPU, it is possible to greatly reduce a time length required for the finalize process, and it is possible to realize (i) the reduction of the recording operation time length and (ii) user's comfortable use. Moreover, for example, if the other middle areas 104-0a and 104-1a are formed in a border-close process, it is also possible to efficiently use the outer circumferential side of the other middle areas 104-0a and 104-1a, as the recording areas.

Fourth Embodiment of Information Recording Medium

Figure 13:
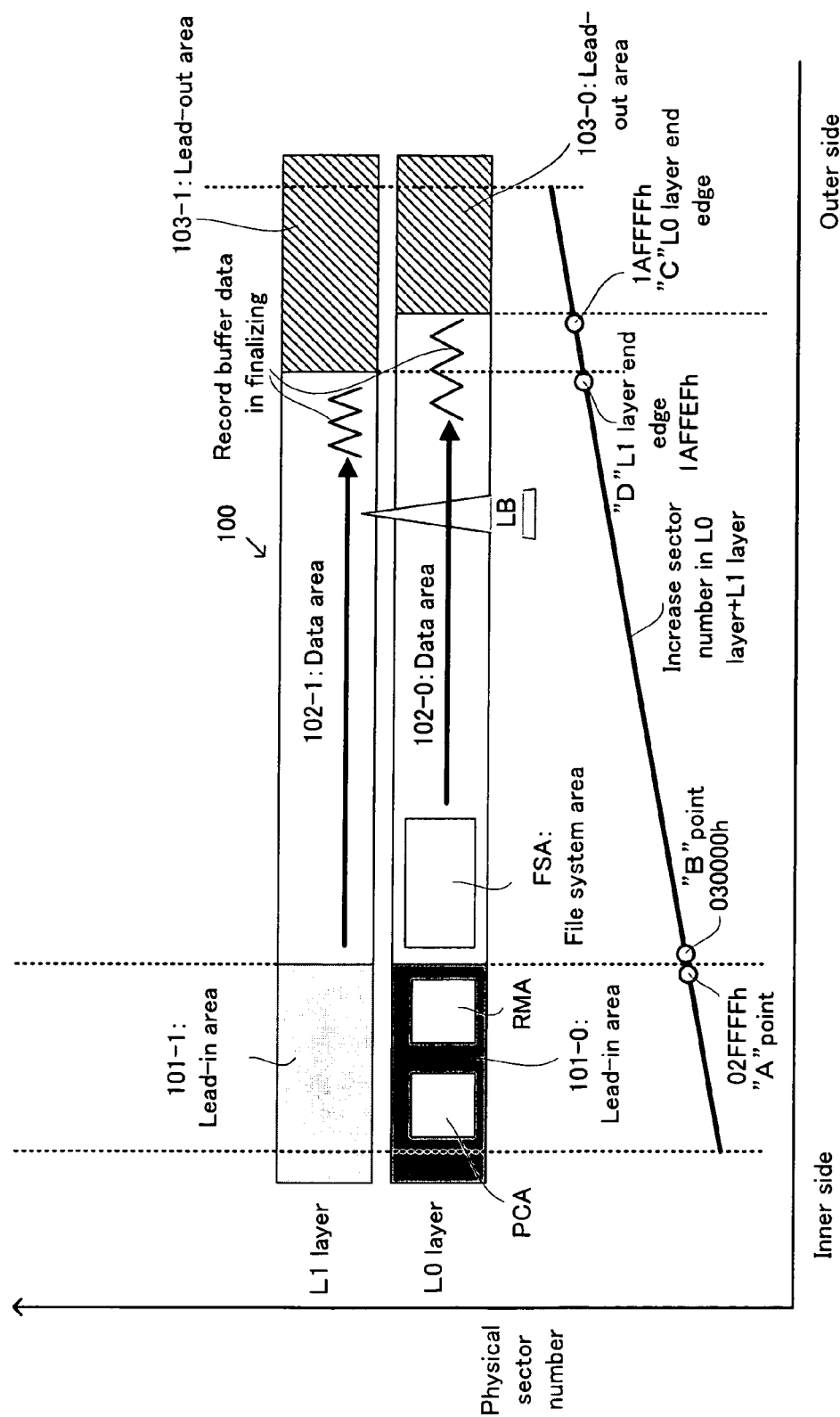
FIG. 13 is a conceptual view showing the data structure of a two-layer type optical disc in a fourth embodiment of the information recording medium of the present invention, the physical sector number of sectors constituting the ECC block in the recording areas of the optical disc, and the recording or reproducing method by a parallel method of the optical disc.

Next, with reference to FIG. 13, an explanation will be given for (ii) the data structure of a two-layer type optical disc in a fourth embodiment of the information recording medium of the present invention, and (ii) the recording or reproducing procedure by the parallel method of the optical disc. FIG. 13 is a conceptual view showing (i) the data structure of the two-layer type optical disc in the fourth embodiment of the information recording medium of the present invention, (ii) the physical sector number of sectors constituting the ECC block in the recording areas of the optical disc, and (iii) the recording or reproducing method by the parallel method of the optical disc. Incidentally, the vertical axis and the horizontal axis are the same as those in FIG. 2 described above.

As shown in FIG. 13, the two-layer type optical disc 100 in the fourth embodiment of the information recording medium of the present invention is provided with: the above-mentioned transparent substrate; and two recording layers laminated on the transparent substrate, i.e. the L0 layer and the L1 layer.

Specifically, the L0 layer is provided with: (i) a lead-in area 101-0; (ii) a data area 102-0; and (iii) a lead-out area 103-0 which is another example of the "first buffer area" of the present invention, from the inner to the outer circumferential side. The lead-in area 101-0 is provided with: the OPC area PCA, and the RM area RMA, described above, and the like.

On the other hand, the L1 layer is provided with: (i) a lead-in area 101-1; (ii) a data area 102-1; and (iii) a lead-out area 103-1 which is one example of the "first buffer area" of the present invention, described above, from the inner to the outer circumferential side. A not-illustrated OPC area or the like may be also provided in the lead-in area 101-1.

In particular, the lead-out areas 103-0 and 103-1 are formed in advance, as the pre-recorded areas, of embossed pits in the case of a DVD-RW, for example, or of pits obtained by irradiation of recording laser in the case of a DVD-R. Moreover, the "identification information" of the present invention and the "start address information" of the present invention are recorded in the RM area RMA, wherein the identification information indicates that the lead-out areas 103-0 and 103-1 are formed in advance, and the start address information indicates the start positions of the lead-out areas 103-0 and 103-1 formed in advance, being substantially same as the first embodiment.

The two-layer type optical disc 100 is constructed in the above manner, so that the control of the focal distance and the like at the time of recording or reproduction of the optical disc 100 are the same as in the above-mentioned opposite method.

In particular, the parallel method is adopted as the recording or reproducing procedure of the two-layer type optical disc in the fourth embodiment of the information recording medium of the present invention. In the parallel method, if the recording or reproduction in the L0 layer is ended, the optical pickup, located on the outermost circumference of the optical disc, needs to be displaced again toward the innermost circumference, when the recording or reproduction in the L1 layer is started. Thus, as compared to the opposite method, it takes more time by that much to change the recording layer from the L0 layer to the L1 layer.

Specifically, firstly, in the L0 layer, as the optical pickup is displaced in the lead-in area 101-0, the data area 102-0, and the lead-out area 103-0, from the inner to the outer circumferential side, the sector number in the recording areas of the optical disc 100 increases. More specifically, the optical pickup sequentially accesses the end position of the lead-in area 101-0 with a sector number of "02FFFFh" (refer to an A point in FIG. 13), the start position of the data area 102-0 with a sector number of "030000h" (refer to a B point in FIG. 13), and the end position of the data area 102-0 with a sector number of "1AFFFFh" (refer to a C point in FIG. 13), and the optical pickup is displaced to the lead-out area 103-0 which functions as the buffer, by which the recording or reproduction is performed in the L0 layer. On the other hand, in the L1 layer, specifically, as the optical pickup is displaced in the lead-in area 101-1, the data area 102-1, and the lead-out area 103-1 from the inner to the outer circumferential side, the sector number in the recording areas of the optical disc 100 increases. More specifically, the optical pickup sequentially accesses the lead-in area 101-1 which functions as the buffer, the start position of the data area 102-1 with a sector number of "030000h" (refer to the B point in FIG. 13), and the end position of the data area 102-1 with a sector number of "1AFFEFh" (refer to a D point in FIG. 13), and the optical pickup is displaced to the lead-out area 103-1, by which the recording or reproduction is performed in the L1 layer.

Thus, the content information is recorded or reproduced at the same time that the optical pickup is continuously displaced, in the sector numbers of "030000h" to "1AFFFFh" of the data area 102-0 in the L0 layer and the sector numbers of "030000h" to "1AFFFFh" of the data area 102-1 in the L1 layer, for example.

With respect to the physical sector number explained above, the Logical Block Address (LBA) is assigned, one to one. More specifically, for example, in the L0 layer, a "000000" LBA corresponds to the sector number of "030000h", and a "17FFEF" LBA corresponds to the sector number of "1AFFFFh". On the other hand, in the L1 layer, a "180000" LBA corresponds to the sector number of "030000h", and a "2FFFEF" LBA corresponds to the sector number of "1AFFFFh".

Consequently, according to the fourth embodiment of the information recording medium of the present invention, in the finalize process, it is only necessary to add the buffer data up to the start positions of the lead-out areas 103-0 and 103-1 with a length in the radial direction of 0.5 mm or more, for example, which are formed in advance as the pre-recorded areas in the outer circumferential edge portion of the L0 layer and the L1 layer, from the end position of the written last information, by using the writing device, such as the optical pickup, of the information recording apparatus above. Thus, as in the first and second embodiments, it is possible to omit the adding of the buffer data into all (or entire) the lead-out areas 103-0 and 103-1 at the time of the finalize process, and it is possible to greatly reduce a time length required for the finalize process. Thus, it is possible to realize (i) the reduction of the recording operation time length and (ii) user's comfortable use.

Fifth Embodiment of Information Recording Medium

Figure 14:
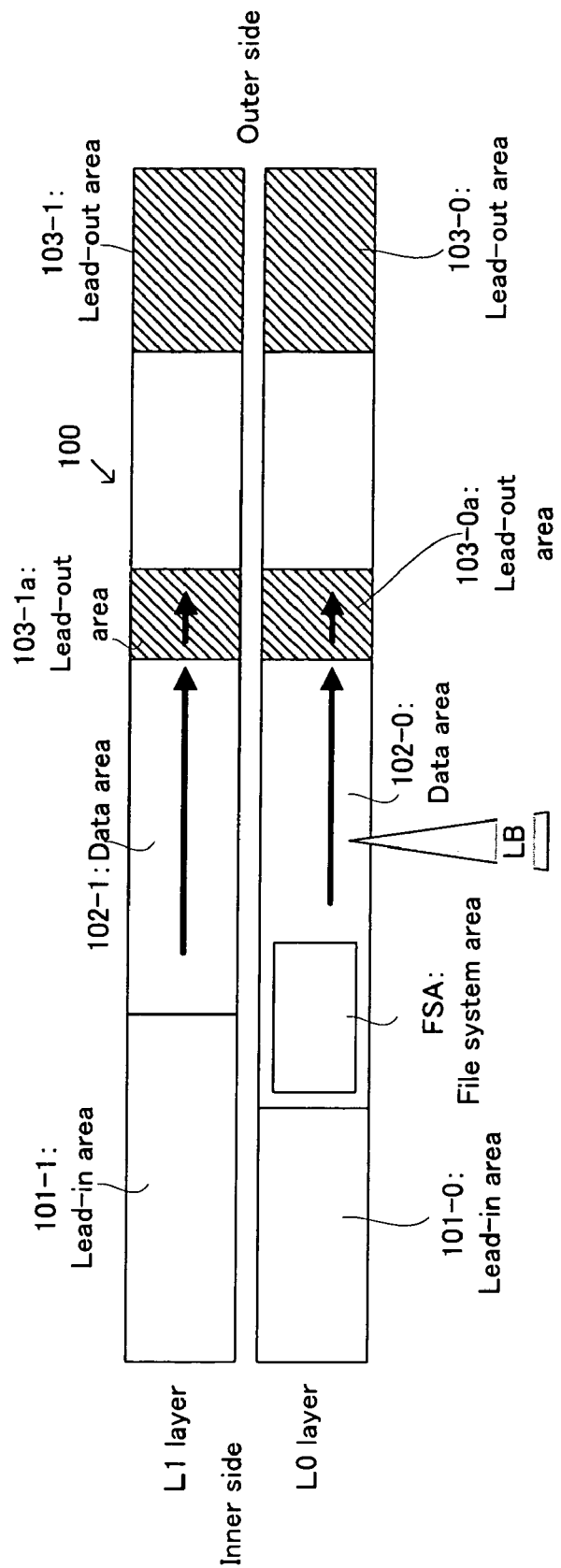
FIG. 14 is a conceptual view showing the data structure of a two-layer type optical disc in a fifth embodiment of the information recording medium of the present invention, and the recording or reproducing method by the parallel method of the optical disc.

Next, with reference to FIG. 14, an explanation will be given for (i) the data structure of a two-layer type optical disc in a fifth embodiment of the information recording medium of the present invention, and (ii) the recording or reproducing procedure by the parallel method of the optical disc. FIG. 14 is a conceptual view showing (i) the data structure of the two-layer type optical disc in the fifth embodiment of the information recording medium of the present invention, and (ii) the recording or reproducing method by the parallel method of the optical disc. In FIG. 14, the left indicates the inner circumferential side of the optical disc, and the right indicates the outer circumferential side of the optical disc.

The data structure of the two-layer type optical disc in the fifth embodiment of the information recording medium of the present invention, and the recording or reproducing method by the parallel method of the optical disc are substantially the same as those in the fourth embodiment explained with reference to FIG. 13.

In particular, in the two-layer type optical disc in the fifth embodiment of the information recording medium of the present invention, the amount of information recorded into the L0 layer and the amount of information recorded into the L1 layer are made substantially equal, on the basis of (i) the total information amount of the record information, (ii) the start address of the lead-out area 103-1 formed in advance as the pre-recorded area of embossed pits or pits obtained by the irradiation of recording laser, and (iii) the recording capacity of the L0 layer and the L1 layer, under the control of the above-mentioned CPU. Then, other lead-out areas 103-0a and 103-1a are formed by the recording of the buffer data, in the middle (e.g., half way) of the data areas 102-0 and 102-1. Thus, at the time of the finalize process, for example, by setting the outer circumferential side of the other lead-out areas 103-0a and 103-1a to be in the unrecorded condition, i.e. in the mirror condition, on the basis of the total amount of the record information and the like, under the control of the CPU, it is possible to greatly reduce a time length required for the finalize process, and it is possible to realize (i) the reduction of the recording operation time length and (ii) user's comfortable use.

Sixth and Seventh Embodiments of Information Recording Medium

Figure 15:
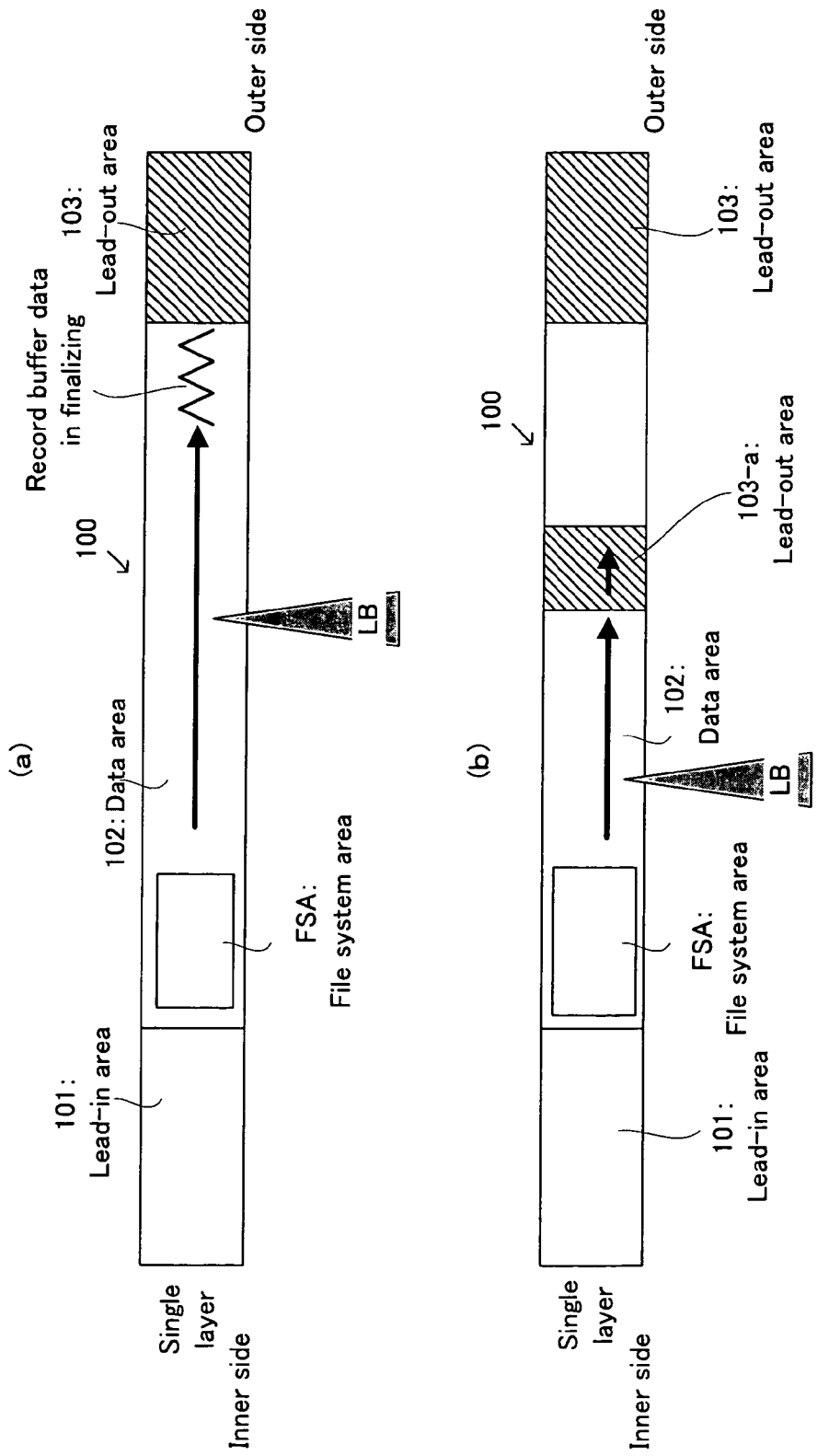
FIG. 15 are a conceptual view (FIG. 15(a)) showing the data structure of a single-layer type optical disc in a sixth embodiment of the information recording medium of the present invention, wherein one lead-out area is formed, and the recording or reproducing method of the optical disc, and a conceptual view (FIG. 15(b)) showing the data structure of a single-layer type optical disc in a seventh embodiment of the information recording medium of the present invention, wherein two lead-out areas are formed.

Next, with reference to FIG. 15, an explanation will be given for (i) the data structure of a single-layer type optical disc in a six embodiment of the information recording medium of the present invention, and (ii) the recording or reproducing procedure of the optical disc. FIG. 15 are a conceptual view (FIG. 15(*a*)) showing (i-1) the data structure of the single-layer type optical disc in the sixth embodiment of the information recording medium of the present invention, wherein one lead-out area is formed, and (i-2) the recording or reproducing method of the optical disc, and a conceptual view (FIG. 15(b)) showing (ii-1) the data structure of a single-layer type optical disc in a seventh embodiment of the information recording medium of the present invention, wherein two lead-out areas are formed, and (ii-2) the recording or reproducing method of the optical disc. In FIG. 15, the left indicates the inner circumferential side of the optical disc, and the right indicates the outer circumferential side of the optical disc.

The data structure of the single-layer type optical disc in the sixth embodiment of the information recording medium of the present invention, and the recording or reproducing method of the optical disc are substantially the same as those in the fourth embodiment adopting the parallel method, explained with reference to FIG. 13. Namely, the six embodiment is an embodiment in which the two recording layers in the fourth embodiment is simplified to a single layer.

In particular, according to the sixth embodiment of the information recording medium of the present invention, in the finalize process, it is only necessary to add the buffer data up to the start position of the lead-out area 103 with a length in the radial direction of 0.5 mm or more, for example, which is formed in advance as the pre-recorded area in the outer circumferential edge portion of the single layer, from the end position of the written last information, by using the writing device, such as the optical pickup, of the information recording apparatus above. Thus, as in the first, second, and fourth embodiments, it is possible to omit the adding of the buffer data into the entire lead-out area 103-0 at the time of the finalize process, and it is possible to greatly reduce a time length required for the finalize process. Thus, it is possible to realize (i) the reduction of the recording operation time length and (ii) user's comfortable use.

As shown in FIG. 15(b), the data structure of the single-layer type optical disc in the seventh embodiment of the information recording medium of the present invention, and the recording or reproducing method of the optical disc are substantially the same as those in the sixth embodiment explained with reference to FIG. 15(a).

In particular, in the single-layer type optical disc in the seventh embodiment of the information recording medium of the present invention, the amount of information recorded on the inner circumferential side of another lead-out area 103-a is determined, on the basis of (i) the total information amount of the record information, (ii) the start address of the lead-out area 103-1 formed in advance as the pre-recorded area of embossed pits or pits obtained by the irradiation of recording laser, and (iii) the recording capacity of the single layer, under the control of the above-mentioned CPU. Then, the other lead-out area 103-a is formed by the recording of the buffer data, in the middle (e.g., half way) of the data area 102. Thus, at the time of the finalize process, for example, by setting the outer circumferential side of the lead-out area 103-a to be in the unrecorded condition, i.e. in the mirror condition, on the basis of the total amount of the record information and the like, under the control of the CPU, it is possible to greatly reduce a time length required for the finalize process, and it is possible to realize (i) the reduction of the recording operation time length and (ii) user's comfortable use.

In the embodiments, a write-once type or rewritable type optical disc, such as a two-layer type DVD-R or DVD-R/W, is explained as one specific example of the information recording medium, and an information recording/reproducing apparatus for the optical disc is explained as one specific example of the information recording apparatus. The present invention, however, can be applied to a multiple layer type optical disc, such as a three layer type, and an information recording/reproducing apparatus for the optical disc. Moreover, it can be also applied to a large-capacity recording medium, such as a Blue-ray disc, and an information recording/reproducing apparatus for the recording medium.

Figure 16:
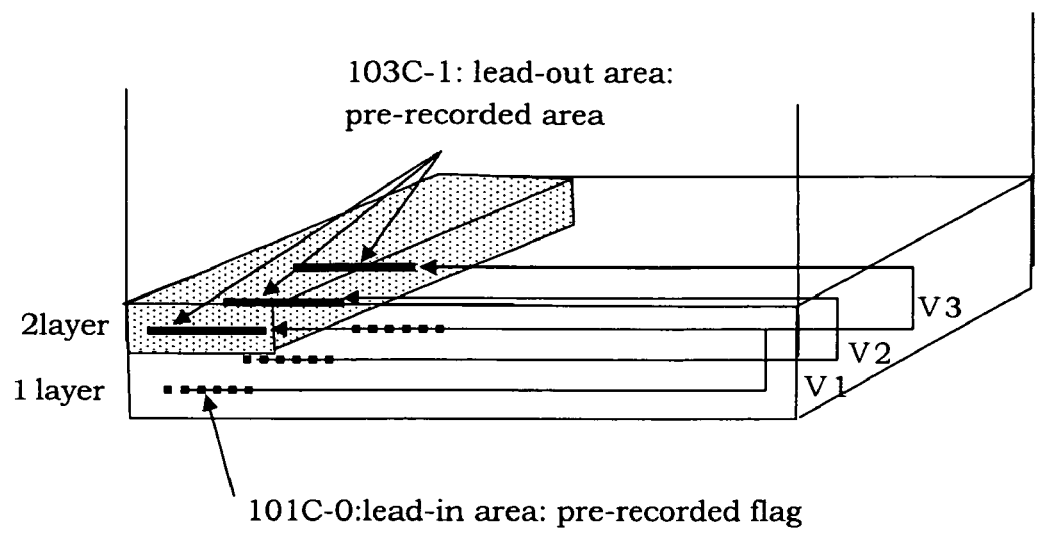
FIG. 16 is a schematic perspective overview showing the data structure of a two-layer type card-shaped optical disc in an eighth embodiment of the information recording medium of the present invention, and the recording or reproducing method which is one example of the opposite method of the optical disc.
Figure 17:
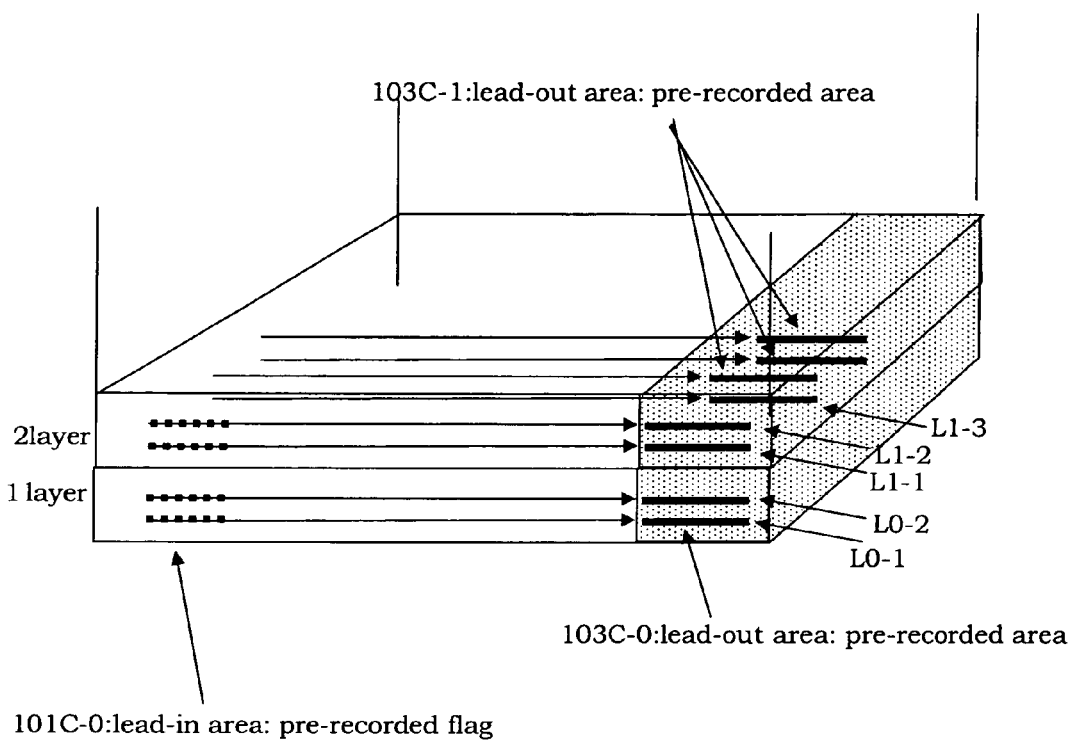
FIG. 17 is a schematic perspective overview showing the data structure of a two-layer type card-shaped optical disc in a ninth embodiment of the information recording medium of the present invention, and the recording or reproducing method which is one example of the parallel method of the optical disc.
Figure 18:
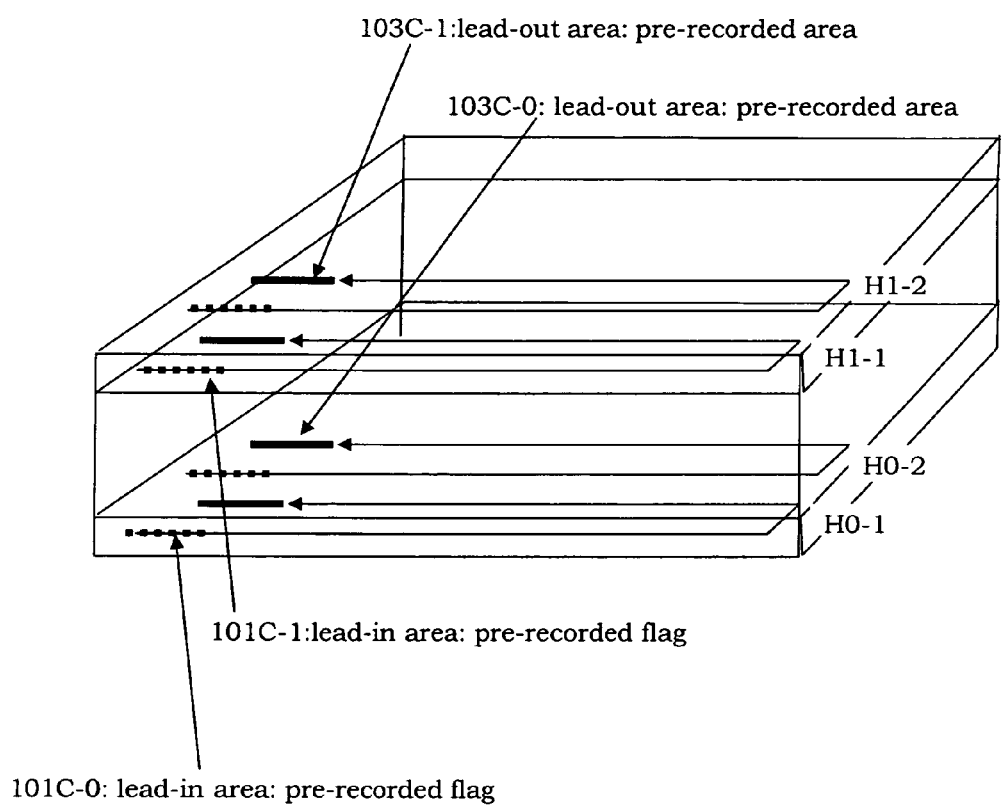
FIG. 18 is a schematic perspective overview showing the data structure of a two-layer type card-shaped optical disc in a tenth embodiment of the information recording medium of the present invention, and the recording or reproducing method which is another example of the opposite method of the optical disc.

In the embodiments, as one specific example of the information recording medium, a multilayer type disc-shaped information recording medium is explained. The present invention, however, can be also applied to a multilayer type card-shaped information recording medium, as in eighth, ninth, and tenth embodiments, respectively shown in FIG. 16, FIG. 17, and FIG. 18. FIG. 16 is a schematic perspective overview showing (i) the data structure of the two-layer type card-shaped recording medium in the eighth embodiment of the information recording medium of the present invention, and (ii) the recording or reproducing method which is one example of the opposite method of the optical disc. FIG. 17 is a schematic perspective overview showing (i) the data structure of the two-layer type card-shaped recording medium in the ninth embodiment of the information recording medium of the present invention, and (ii) the recording or reproducing method which is one example of the parallel method of the optical disc. FIG. 18 is a schematic perspective overview showing (i) the data structure of the two-layer type card-shaped recording medium in the tenth embodiment of the information recording medium of the present invention, and (ii) the recording or reproducing method which is another example of the opposite method of the optical disc. Incidentally, in FIG. 16, FIG. 17, and FIG. 18, the left indicates one edge portion of the card-shaped recording medium, and the right indicates the other edge portion.

More specifically, in the card-shaped recording medium using one example of the opposite method shown in FIG. 16, flag is recorded in a lead-in area 101C-0 in the one edge portion of the first layer, wherein the flag indicates that a lead-out area 103C-1 in the one edge portion of the second layer is formed in advance as the pre-recorded area. Then, on a vertical surface V1 of the card-shaped recording medium, the recording or reproduction is performed from the one edge portion to the other edge portion of the first layer. Then, after the layer jump from the other edge portion of the first layer to the other edge portion of the second layer, the recording or reproduction is performed from the other edge portion to the lead-out area 103C-1 in the one edge portion of the second layer.

Then, in the same manner, the recording or reproduction is performed even on vertical surfaces V2 and V3, and the like.

Moreover, in the card-shaped recording medium using one example of the parallel method shown in FIG. 17, flag is recorded in a lead-in area 101C-0 in the one edge portion of the first layer, wherein the flag indicates that a lead-out area 103C-0 in the other edge portion of the first layer is formed in advance as the pre-recorded area. Then, on a linear line L0-1 of the card-shaped recording medium, the recording or reproduction is performed from the one edge portion to the other edge portion of the first layer. Then, after the layer jump from the other edge portion of the first layer to the one edge portion of the second layer, the recording or reproduction is performed from the one edge portion to a lead-out area 103C-1 in the other edge portion of the second layer, on a linear line L1-1.

Then, in the same manner, the recording or reproduction is performed even on linear lines L0-2 and L1-2, and the like.

In the card-shaped recording medium using another example of the opposite method shown in FIG. 18, flag is recorded in a lead-in area 101C-0 in the one edge portion of the first layer, wherein the flag indicates that a lead-out area 103C-0 in the one edge portion of the first layer is formed in advance as the pre-recorded area. Then, on a plane H0-1 of the card-shaped recording medium, the recording or reproduction is performed from the one edge portion to the other edge portion of the first layer. Then, without layer jump from the first layer to the second layer, the recording or reproduction is performed from the other edge portion to the lead-out area 103C-0 in the one edge portion of the first layer.

Then, in the same manner, the recording or reproduction is performed even on planes H0-2, H1-1, and H1-2, and the like.

As described above, even in the eighth to tenth embodiments, as in the first to seventh embodiments, it is possible to omit the adding of the buffer data into the entire lead-out area 103 at the time of the finalize process, and it is possible to greatly reduce a time length required for the finalize process. Thus, it is possible to realize (i) the reduction of the recording operation time length and (ii) user's comfortable use.

The present invention is not limited to the above-described embodiments, and various changes may be made, if desired, without departing from the essence or spirit of the invention which can be read from the claims and the entire specification. An information recording medium, an information recording apparatus, an information recording method, and a computer program for recording control, which involve such changes, are also intended to be within the technical scope of the present invention.

INDUSTRIAL APPLICABILITY

The information recording medium, the information recording apparatus and method, and the computer program according to the present invention can be applied to a high-density recording medium, such as a DVD, and also applied to a DVD recorder or the like. Moreover, they can be applied to an information recording apparatus or the like, which is mounted on or can be connected to various computer equipment for consumer use or business use, for example.

The invention claimed is:

1. An information recording medium comprising:
a first recording layer in which a first recording track path for recording at least record information, is formed;
a second recording layer which is disposed on said first recording layer and in which a second recording track path for recording the record information, is formed in a opposite direction to the first recording track path,
a first buffer area for preventing a recording or reproduction position from deviating from said second recording layer, being formed in advance as a pre-recorded area, of embossed pits or pits obtained by irradiation of recording laser, in one edge portion of said second recording layer, and
said information recording medium further comprising a management area to record therein identification information indicating whether or not said first buffer area is formed in advance as the pre-recording area.

2. The information recording medium according to claim 1, wherein
said management area is formed in a control data zone in a lead-in area accessed before the record information is recorded.

3. The information recording medium according to claim 1, wherein
pre-format address information is recorded in each of said recording layers, and
identification information indicating that said first buffer area is formed in advance, is added to the pre-format address information.

4. The information recording medium according to claim 3, wherein start address information indicating a start position of said first buffer area formed in advance, is recorded in said control data zone, or is added to pre-format address information.

5. The information recording medium according to claim 4, wherein the start address information indicates that said first buffer area is not formed in advance, when having a predetermined value.

6. The information recording medium according to claim 1, wherein (i) said first buffer area is formed in advance of embossed pits, and (ii) a recording film capable of performing additional recording, is laminated thereon.

7. An information recording medium comprising:
a first recording layer in which a first recording track path for recording at least record information, is formed;
a second recording layer which is disposed on said first recording layer and in which a second recording track path for recording the record information, is formed in a same direction to the first recording track path,
a first buffer area for preventing a recording or reproduction position from deviating from said first recording layer or said second recording layer, being formed in advance as a pre-recorded area, of embossed pits or pits obtained by irradiation of recording laser, in other edge portions of said first recording layer and said second recording layer, and
said information recording medium further comprising a management area to record therein identification information indicating whether or not said first buffer area is formed in advance as the pre-recording area.

8. An information recording medium comprising:
a recording layer in which a recording track path for recording record information is formed,
a first buffer area for preventing a recording or reproduction position from deviating from said recording layer, being formed in advance as a pre-recorded area, of embossed pits or pits obtained by irradiation of recording laser, in other edge portion of said recording layer, and
said information recording medium further comprising a management area to record therein identification information indicating whether or not said first buffer area is formed in advance as the prerecording area.

9. An information recording apparatus (i-a) for recording a first portion of the record information along the first recording track path, and (ii-a) for recording a second portion of the record information, with a recording direction turned around, along the second recording track path, with respect to an information recording medium, constructed such that (iii-1) a first recording layer has a first recording capacity and (iii-2) a second recording layer has a second recording capacity,
said information recording medium comprising:
the first recording layer in which a first recording track path for recording at least record information, is formed;
the second recording layer which is disposed on said first recording layer and in which a second recording track path for recording the record information, is formed in an opposite direction to the first recording track path,
a first buffer area for preventing a recording or reproduction position from deviating from said second recording layer, being formed in advance as a prerecorded area, of embossed pits or pits obtained by irradiation of recording laser, in one edge portion of said second recording layer, and
said information recording medium further comprising a management area to record therein identification information indicating whether or not said first buffer area is formed in advance as the prerecording area, said information recording apparatus comprising:

an obtaining device for obtaining the identification information;

a writing device capable of respectively writing the record information into said first recording layer and said second recording layer as the first portion and the second portion;

a calculating device for calculating a turn-around address on the first recording track path, in turning around from the first recording track path to the second recording track path, in a case (iv-1) where the first portion with an information amount which is equal to or less than the first recording capacity, out of the record information, is written along the first recording track path, and (iv-2) where the second portion with an information amount which is equal to or less than the second recording capacity is written along the second recording track path, on the basis of (v-0) the obtained identification information, (v-1) a total information amount of the record information, (v-2) the start address information indicating the start address of said first buffer area formed in advance, (v-3) the first recording capacity, and (v-4) the second recording capacity; and a controlling device for controlling said writing device, (i) to write the first portion into said first recording layer along the first recording track path up to the calculated turnaround address, and (ii) to write the second portion into said second recording layer along the second recording track path from a correspondence address in said second recording layer corresponding to the calculated turnaround address in said first recording layer.

10. The information recording apparatus according to claim 9, wherein said controlling device controls said writing device to add the buffer data up to the start position of said first buffer area, in response to a finalize instruction for maintaining compatibility with a read-only or reproduce-only information recording medium.

11. The information recording apparatus according to claim 9, wherein said controlling device controls said writing device to add the buffer data. in order to form at least one portion of a second buffer area, (i) for preventing a recording or reproduction position from deviating from said first recording layer or said second recording layer and (ii) for layer jump, in other edge portions of said first recording layer and said second recording layer, after the writing up to the turn-around address in said first recording layer, and before the writing from the correspondence address in said second recording layer.

12. The information recording apparatus according to claim 9, wherein said controlling device controls said writing device to write the buffer data, in order to form a third buffer area located on one side of the second buffer area, on the basis of (i) the total information amount of the record information, (ii) the start address information indicating the start address of said first buffer area formed in advance, (iii) the first recording capacity, and (iv) the second recording capacity.

13. An information recording apparatus for (i-a) recording a first portion of the record information along the first recording track path, and (ii-a) for recording a second portion of the record information along the second recording track path which is the same recording direction as that of the first recording track path, with respect to an information recording medium constructed such that (iii-1) a first recording layer has a first recording capacity and (iii-2) a second recording layer has a second recording capacity, said information recording medium comprising:

the first recording layer in which a first recording track path for recording at least record information, is formed;

the second recording layer which is disposed on said first recording layer and in which a second recording track path for recording the record information, is formed in a same direction to the first recording track path, a first buffer area for preventing a recording or reproduction position from deviating from said first recording layer or said second recording layer, being formed in advance as a pre-recorded area, of embossed pits or pits obtained by irradiation of recording laser, in other edge portions of said first recording layer and said second recording layer, and said information recording medium further comprising a management area to record therein identification information indicating whether or not said first buffer area is formed in advance as the pre-recording area, said information recording apparatus comprising:

an obtaining device for obtaining the identification information;

a writing device capable of respectively writing the record information into said first recording layer and said second recording layer as the first portion and the second portion;

a calculating device for calculating a first recording end edge address on the first recording track path and a second recording end edge address on the second recording track path, in a case (iv-1) where the first portion with an information amount which is equal to or less than the first recording capacity, out of the record information, is written along the first recording track path, and (iv-2) where the second portion with an information amount which is equal to or less than the second recording capacity is written along the second recording track path, on the basis of (v-0) the obtained identification information, (v-1) a total information amount of the record information, (v-2) the start address information indicating the start address of said first buffer area formed in advance, (v-3) the first recording capacity, and (v-4) the second recording capacity; and a controlling device for controlling said writing device, (i) to write the first portion into said first recording layer along the first recording track path up to the calculated first recording end edge address, and (ii) to write the second portion into said second recording layer along the second recording track path up to the calculated second recording end edge address.

14. The information recording apparatus according to claim 13, wherein said controlling device controls said writing device to write the buffer data, from one of the first and second recording end edge addresses which has a larger address value, to an address value minimum necessary to form a fourth buffer area located on one side of said first buffer area, in response to a finalize instruction for maintaining compatibility with a read-only or reproduce-only information recording medium.

15. An information recording method in an information recording apparatus comprising a writing device (i-a) for recording a first portion of the record information along the first recording track path, and (ii-a) for recording a second portion of the record information, with a recording direction turned around, along the second recording track path, with respect to said information recording medium according to claim 1 constructed such that (iii-1) said first recording layer has a first recording capacity and (iii-2) said second recording layer has a second recording capacity, said information recording method comprising:

an obtaining process of obtaining the identification information;

a calculating process of calculating a turn-around address on the first recording track path, in turning around from the first recording track path to the second recording track path, in a case (iv-1) where the first portion with an information amount which is equal to or less than the first recording capacity, out of the record information, is written along the first recording track path, and (iv-2) where the second portion with an information amount which is equal to or less than the second recording capacity is written along the second recording track path, on the basis of (v-0) the obtained identification information, (v-1) a total information amount of the record information, (v-2) the start address information indicating the start address of said first buffer area formed in advance, (v-3) the first recording capacity, and (v-4) the second recording capacity; and a controlling process of controlling said writing device, (i) to write the first portion into said first recording layer along the first recording track path up to the calculated turnaround address, and (ii) to write the second portion into said second recording layer along the second recording track path from a correspondence address in said second recording layer corresponding to the calculated turnaround address in said first recording layer.

16. An information recording method in an information recording apparatus comprising a writing device (i-a) for recording a first portion of the record information along the first recording track path, and (ii-a) for recording a second portion of the record information along the second recording track path which is the same recording direction as that of the first recording track path, with respect to said information recording medium according to claim 2 constructed such that (iii-1) said first recording layer has a first recording capacity and (iii-2) said second recording layer has a second recording capacity, said information recording method comprising:

an obtaining process of obtaining the identification information;

a calculating process of calculating a first recording end edge address on the first recording track path and a second recording end edge address on the second recording track path, in a case (iv-1) where the first portion with an information amount which is equal to or less than the first recording capacity, out of the record information, is written along the first recording track path, and (iv-2) where the second portion with an information amount which is equal to or less than the second recording capacity is written along the second recording track path, on the basis of (v-0) the obtained identification information, (v-1) a total information amount of the record information, (v-2) the start address information indicating the start address of said first buffer area formed in advance, (v-3) the first recording capacity, and (v-4) the second recording capacity; and a controlling process of controlling said writing device, (i) to write the first portion into said first recording layer along the first recording track path up to the calculated first recording end edge address, and (ii) to write the second portion into said second recording layer along the second recording track path up to the calculated second recording end edge address.

\* \* \* \* \*